US012804205B2

(12) United States Patent
Yin et al.

(10) Patent No.: US 12,804,205 B2
(45) Date of Patent: Nov. 17, 2026

(54) FACE FEATURE TRANSLATOR FOR GENERATIVE FACE VIDEO COMPRESSION

(71) Applicant: Alibaba (China) Co., Ltd., Hangzhou (CN)

(72) Inventors: Shanzhi Yin, Kowloon Tong (HK); Bolin Chen, Beijing (CN); Yan Ye, San Diego, CA (US); Shiqi Wang, Kowloon Tong (HK)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/810,257

(22) Filed: Aug. 20, 2024

(65) Prior Publication Data

US 2025/0088675 A1 Mar. 13, 2025

Related U.S. Application Data

(60) Provisional application No. 63/581,682, filed on Sep. 10, 2023.

(51) Int. Cl.

| | |
|---|---|
| ***H04N 19/85*** | (2014.01) |
| ***H04N 19/136*** | (2014.01) |
| ***H04N 19/172*** | (2014.01) |
| ***H04N 19/60*** | (2014.01) |
| ***H04N 19/91*** | (2014.01) |

(52) U.S. Cl.

CPC ........... *H04N 19/85* (2014.11); *H04N 19/136* (2014.11); *H04N 19/172* (2014.11); *H04N 19/60* (2014.11); *H04N 19/91* (2014.11)

(58) Field of Classification Search

CPC .... H04N 19/85; H04N 19/136; H04N 19/172; H04N 19/60; H04N 19/91

See application file for complete search history.

(56) References Cited

U.S. PATENT DOCUMENTS 9,245,176 B2 * 1/2016 Matthews ............ G06V 40/176
11,151,695 B1 10/2021 Mihal et al.
(Continued)

FOREIGN PATENT DOCUMENTS

CN 112135135 A 12/2020
CN 114422795 A 4/2022
(Continued)

OTHER PUBLICATIONS

Yoo, Sahng Min translation of WO 2024101635 Sep. 15, 2023 (Year: 2023).*
(Continued)

*Primary Examiner* — Zaihan Jiang

(74) *Attorney, Agent, or Firm* — Finnegan, Henderson Farabow, Garrett & Dunner, LLP

(57) ABSTRACT

Methods and apparatuses are provided for performing generative face video compression by using a face feature translator. An exemplary method includes receiving a bitstream associated with a first type of facial feature data representing a facial picture; and decoding, using coded information of the bitstream, one or more pictures, wherein the decoding includes: transforming the first type of facial feature data into a second type of facial feature data; and reconstructing the facial picture based on the second type of facial feature data.

16 Claims, 19 Drawing Sheets

General flowchart for exemplary generative face video compression system

(56) References Cited

U.S. PATENT DOCUMENTS

| | | | | |
|---|---|---|---|---|
| 2010/0214445 | A1* | 8/2010 | Chronqvist | H04N 23/61 348/347 |
| 2019/0087686 | A1* | 3/2019 | Du | G06F 18/253 |
| 2019/0253624 | A1* | 8/2019 | Kim | G06T 3/40 |

FOREIGN PATENT DOCUMENTS

| | | | | |
|---|---|---|---|---|
| CN | 115769571 | A | | 3/2023 |
| CN | 115830414 | A | * | 3/2023 |
| CN | 116508319 | A | | 7/2023 |
| WO | WO-2022260386 | | * | 6/2022 |
| WO | WO-2024101635 | | * | 9/2023 |

OTHER PUBLICATIONS

Kang, Ji-Su translation of WO 2022260386 Jun. 7, 2022 (Year: 2022).*

He, Xiang translation of CN 115830414 A Dec. 8, 2022 (Year: 2022).*

Balle et al., End-to-End Optimized Image Compression, ICLR, 2017, 27 pages.

Bross et al., "Overview of the Versatile Video Coding (VVC) Standard and Its Applications," IEEE Transactions on Circuits and Systems for Video Technology, vol. 31, No. 10, pp. 3736-3764, 2021.

Chen et al., "Beyond key-point coding: Temporal evolution inference with compact feature representation for talking face video compression," in Proceedings of the IEEE Data Compression Conference, 10 pages, 2022.

Chen et al., "Interactive Face Video Coding: A Generative Compression Framework," IEEE Transactions on Pattern Analysis and Machine Intelligence, 14 pages, 2023.

Goodfellow et al., "Generative adversarial nets," Advances in neural information processing systems, vol. 27, 9 pages, 2014.

Lopez et al., "Head pose computation for very low bitrate video coding," in International Conference on Computer Analysis of Images and Patterns. Springer, 1995, pp. 440-447.

Lu et al. "DVC: An end-to-end deep video compression framework," In Proceedings of the IEEE Conference on Computer Vision and Pattern Recognition, pp. 11006-11015, 2019.

Pearson et al., "Visual Communication at Very Low Data Rates," Proceedings of the IEEE, vol. 73, No. 4, pp. 795-812, 1985.

Siarohin et al., "First Order Motion Model for Image Animation," Advances in Neural Information Processing Systems, vol. 32, pp. 7137-7147, 2019.

Sullivan et al., "Overview of the High Efficiency Video Coding (HEVC) Standard," IEE Transactions on Circuits and Systems for Video Technology, vol. 22, No. 12, pp. 1649-1668 (2012).

Wang et al., "One-shot free-view neural talking-head synthesis for video conferencing," in Proceedings of the IEEE/CVFConference on Computer Vision and Pattern Recognition, 2021, pp. 10039-10049.

Wiegand et al., "Overview of the H.264/AVC Video Coding Standard," IEEE Transactions on Circuitds and Systems for Video Technology, vol. 13, No. 7, Jul. 2003, pp. 560-576.

PCT International Search Report and Written Opinion mailed Oct. 11, 2024, issued in corresponding International Application No. PCT/CN2024/115891 (8 pgs.).

* cited by examiner

General flowchart for exemplary generative face video compression system

General facial representations for exemplary generative face video compression system

500

Exemplary architecture of the deep-based video generative compression framework, e.g., first order motion model (FOMM)

Exemplary talking face video encoder-decoder coding framework with the 1×4×4 compact feature size Generative face video coding with proposed face feature translator Exemplary face feature translator

1200

FACE FEATURE TRANSLATOR FOR GENERATIVE FACE VIDEO COMPRESSION

CROSS-REFERENCE TO RELATED APPLICATIONS

The disclosure claims the benefits of priority to U.S. Provisional Application No. 63/581,682, filed on Sep. 10, 2023, which is incorporated herein by reference in its entirety.

TECHNICAL FIELD

The present disclosure generally relates to video processing, and more particularly, to methods and apparatuses for generative face video compression using a face feature flow translator.

BACKGROUND

A video is a set of static pictures (or “frames”) capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatuses for generative face video compression using a face feature flow translator.

According to some exemplary embodiments, there is provided a method of decoding a bitstream to output one or more pictures for a video stream, the method comprising: receiving a bitstream associated with a first type of facial feature data representing a facial picture; and decoding, using coded information of the bitstream, one or more pictures, wherein the decoding comprises: transforming the first type of facial feature data into a second type of facial feature data; and reconstructing the facial picture based on the second type of facial feature data.

According to some exemplary embodiments, there is provided a method of encoding a video sequence into a bitstream, the method comprising: receiving a video sequence; encoding one or more pictures of the video sequence; and generating a bitstream associated with the encoded pictures, wherein the encoding comprises: generating a first type of facial feature data representing a facial picture; and generating and encoding, into the bitstream, information associated with the first type of facial feature data, wherein the first type of facial feature data is transformable by a translator into a second type of facial feature data.

According to some exemplary embodiments, there is provided a non-transitory computer readable storage medium storing a bitstream of a video. The bitstream includes a first type of facial representation data. The first type of facial representation data is for processing by a decoder that decodes the bitstream according to a method including: transforming, using coded information of the bitstream associated with a first type of facial feature representing a facial picture, the first type of facial feature data into a second type of facial feature data; and reconstructing the facial picture based on the second type of facial feature data.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Figure 1:
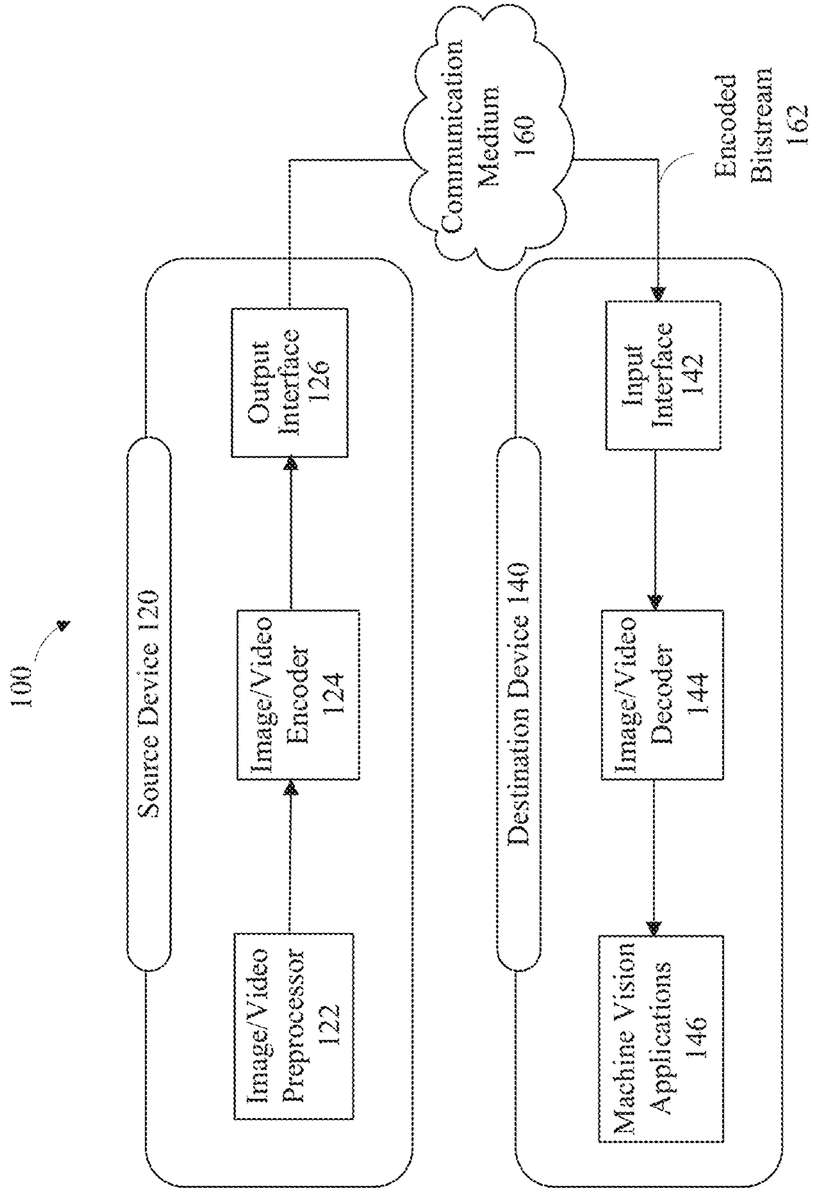
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
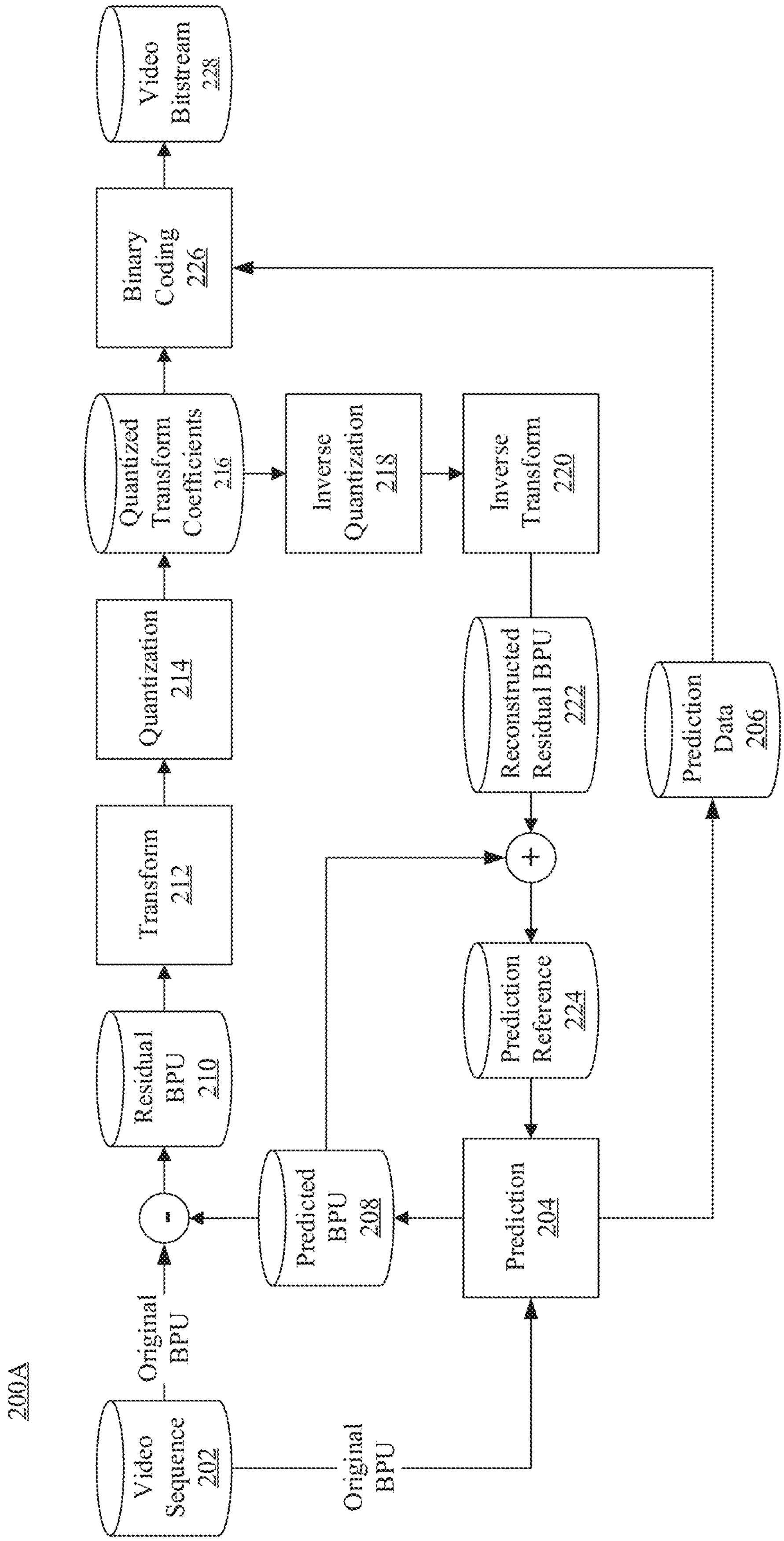
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
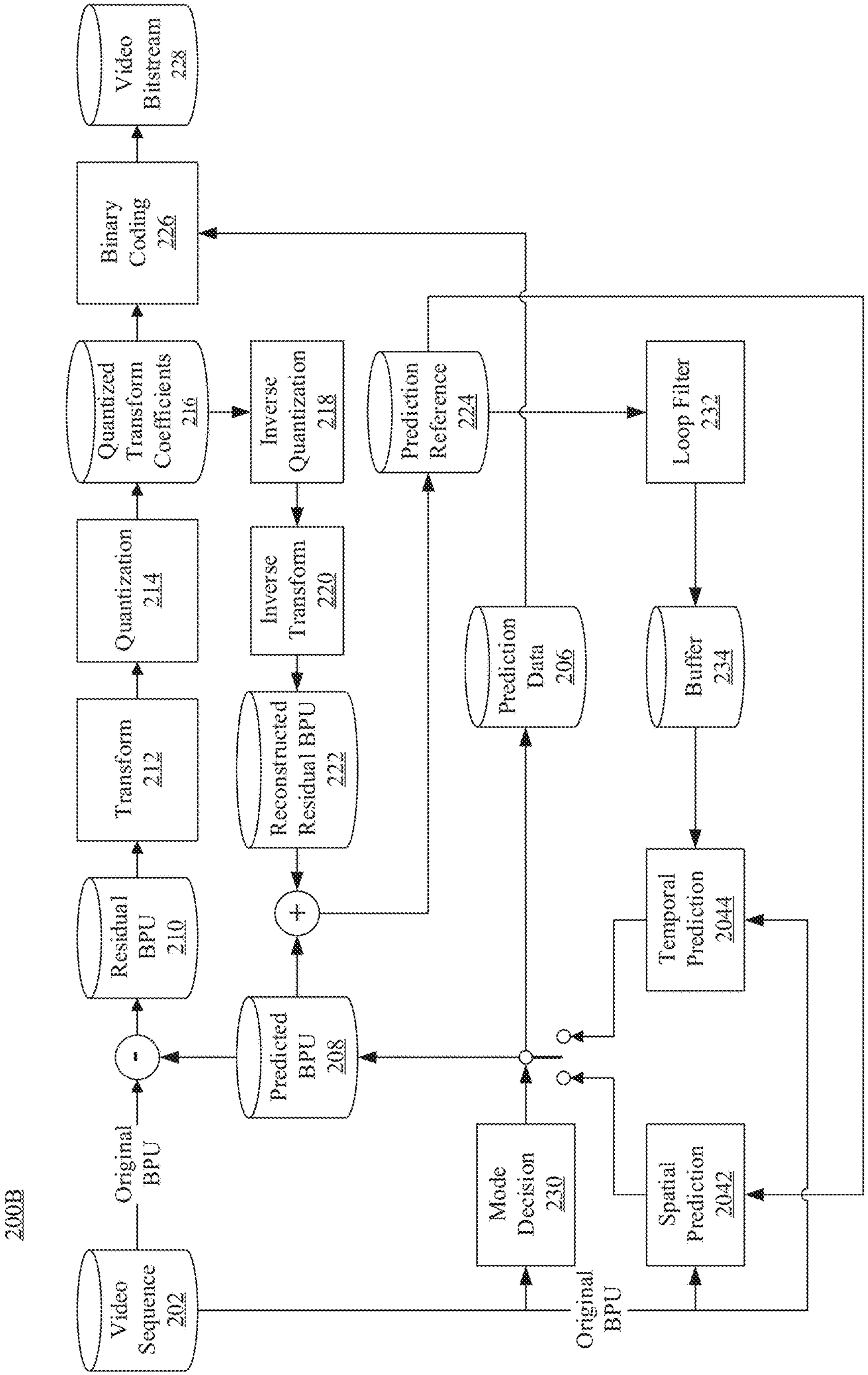
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

In some embodiments, the input video sequence 202 is processed block by block according to encoding process 200B. In VVC, a coded tree unit (CTU) is the largest block unit, and can be as large as 128×128 luma samples (plus the corresponding chroma samples depending on the chroma format). A CTU may be further partitioned into coding units (CUs) using quad-tree, binary tree, or ternary tree. At the leaf nodes of the partitioning structure, coding information such as coding mode (intra mode or inter mode), motion information (reference index, motion vector difference, etc.) if inter coded, and quantized transform coefficients 216 are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block. Inter prediction may use uni-prediction or bi-prediction. In uni-prediction, only one motion vector pointing to one reference picture is used to generate the prediction signal for the current block; and in bi-prediction, two motion vectors, each pointing to its own reference picture are used to generate the prediction signal of the current block. Motion vectors and reference indices are sent to the decoder to identify where the prediction signal(s) of the current block come from. After intra or inter prediction, the mode decision stage 230 choose the best prediction mode for the current block, for example based on the rate-distortion optimization method. Based on the best prediction mode, predicted BPU 208 is generated and subtracted from the input video block.

Still referring to FIG. 2B, the prediction residual BPU 210 is sent to the transform stage 212 and quantization stage 214 to generate quantized transform coefficients 216. Quantized transform coefficients 216 will then be inverse quantized at inverse quantization stage 218 and inverse transformed at inverse transform stage 220 to obtain the reconstructed residual BPU 222. Predicted BPU 208 and reconstructed residual BPU 222 are added together to form prediction reference 224 before loop filtering, which is used to provide reference samples for intra prediction. Loop filtering such as deblocking, sample adaptive offset (SAO), and adaptive loop filter (ALF) may be applied at loop filter stage 232 to prediction reference 224 to form the reconstructed block, which is stored in buffer 234, and used to provide reference samples for inter prediction. Coding information, which is generated at mode decision stage 230, such as coding mode (intra or inter prediction), intra prediction mode, motion information, quantized residual coefficients, and the like, are sent to binary coding stage 226 to further reduce the bit rate before being packed into the output video bitstream 228.

Figure 3A:
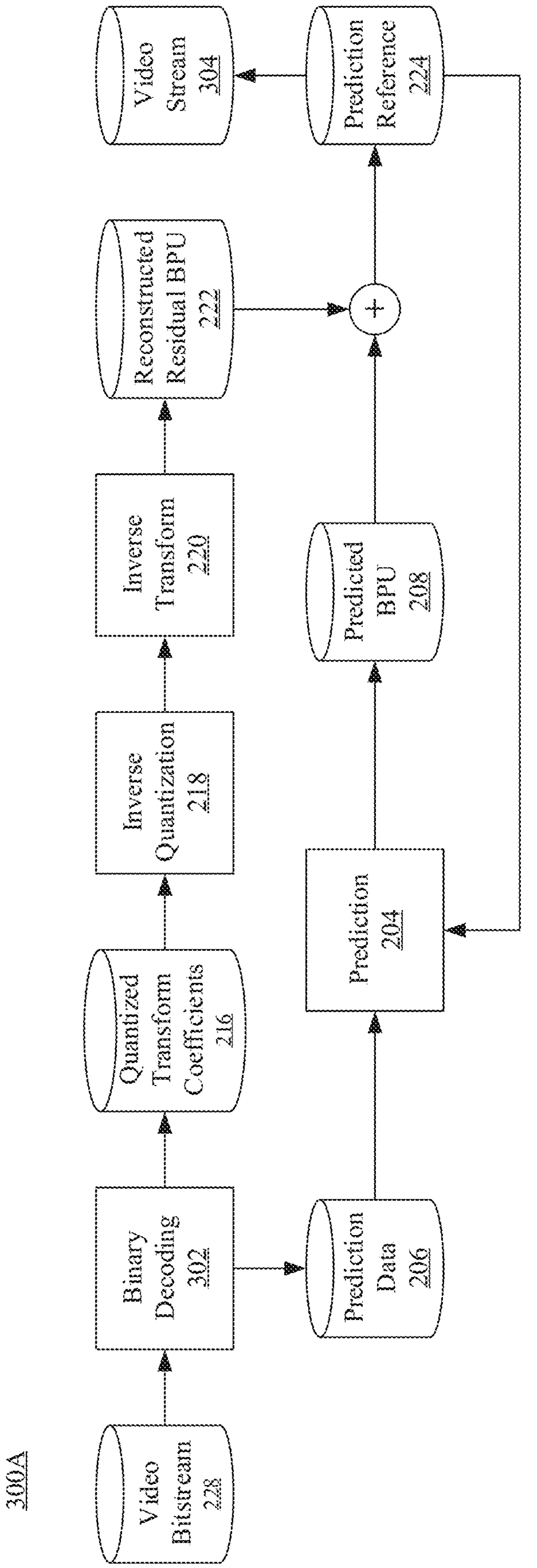
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
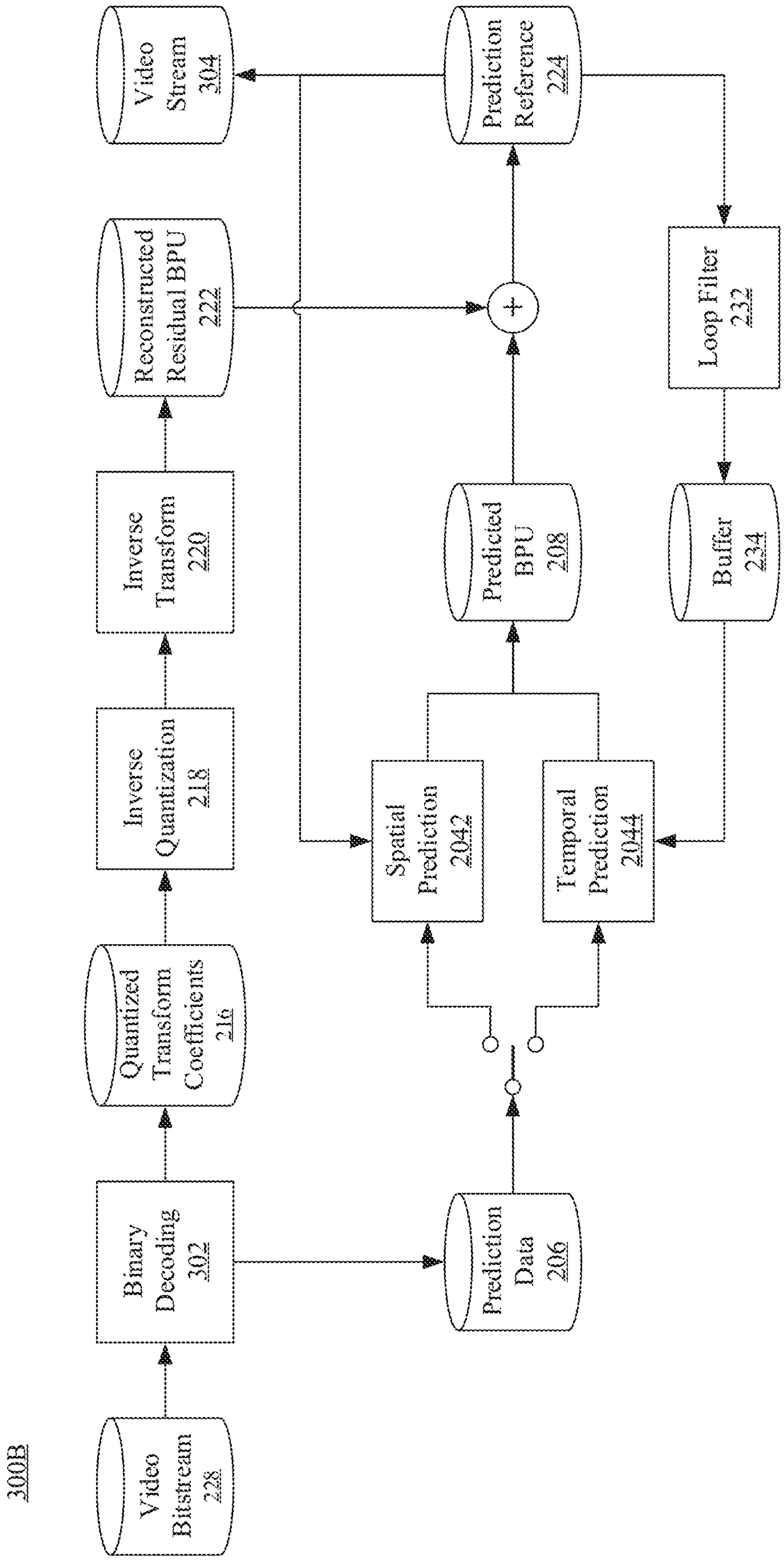
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
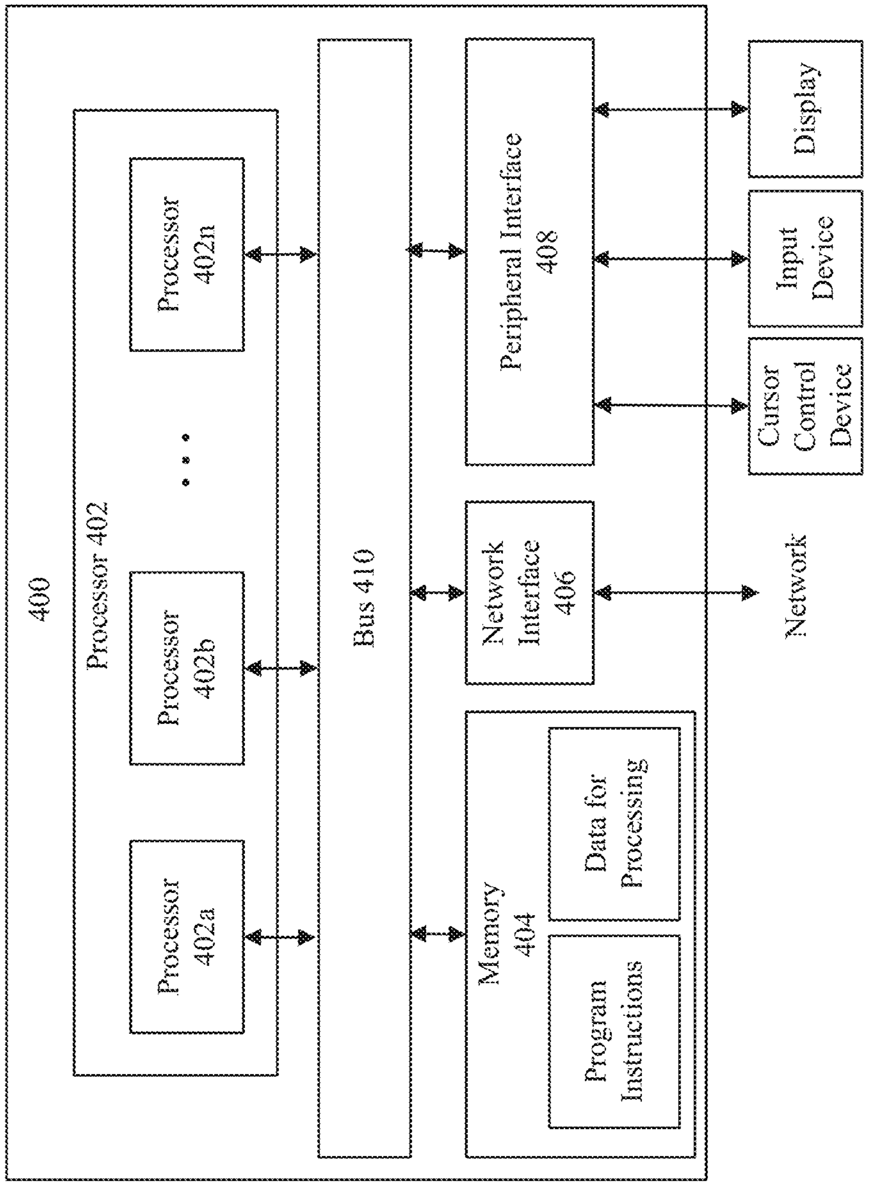
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Recently, face video communication has shown explosive growth and great application potentials, which can further support the service for online video conferencing/chat, education, e-commerce, live broadcasting, and other industries. In particular, visual face data in these multimedia applications has become an important-type and large-proportion data in the transmission network around the world. As such, one of the problems faced by the multimedia applications is how to compactly characterize and efficiently transmit the visual face information. That is, face data conforming to human visual system (HVS) needs to be reconstructed when pursuing higher compression efficiency.

In the past decades, a wide variety of video codecs, such as Advanced Video Coding (AVC), High Efficiency Video Coding (HEVC), and Versatile Video Coding (VVC), have been developed and optimized towards the trade-offs between reconstruction quality and bit-rate constraints. Although these video codecs have enabled the applications of video conferencing/chat and live broadcasting, the efficient visual face communication cannot be fully achieved since they lack the consideration regarding the statistical characteristics of face visual signal. Beyond these hybrid video coding frameworks, model-based coding (MBC), which at least date back to the 1980*s*, were dedicated to boosting the face video compression efficiency via strong face priors.

Figure 5A:
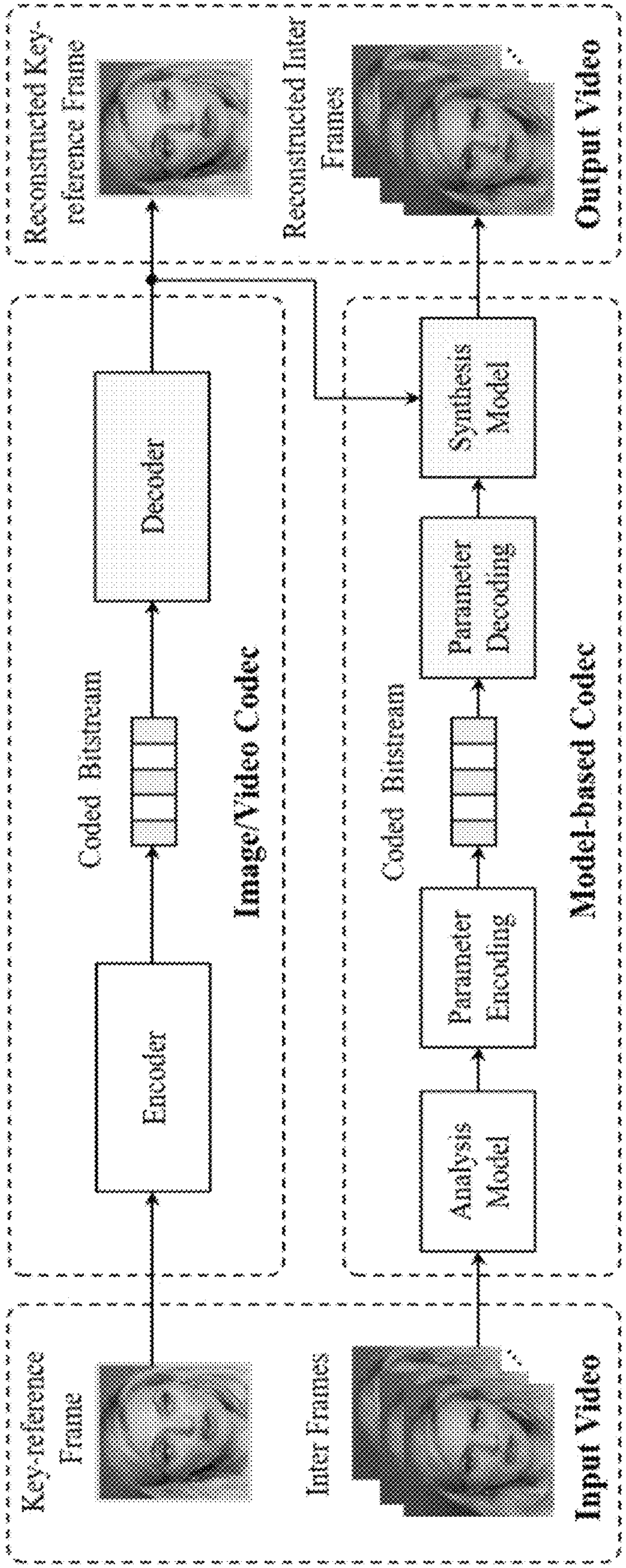
FIG. 5A is general flow chart of operations performed by an exemplary generative face video compression system, according to some embodiments of the present disclosure.
Figure 5B:
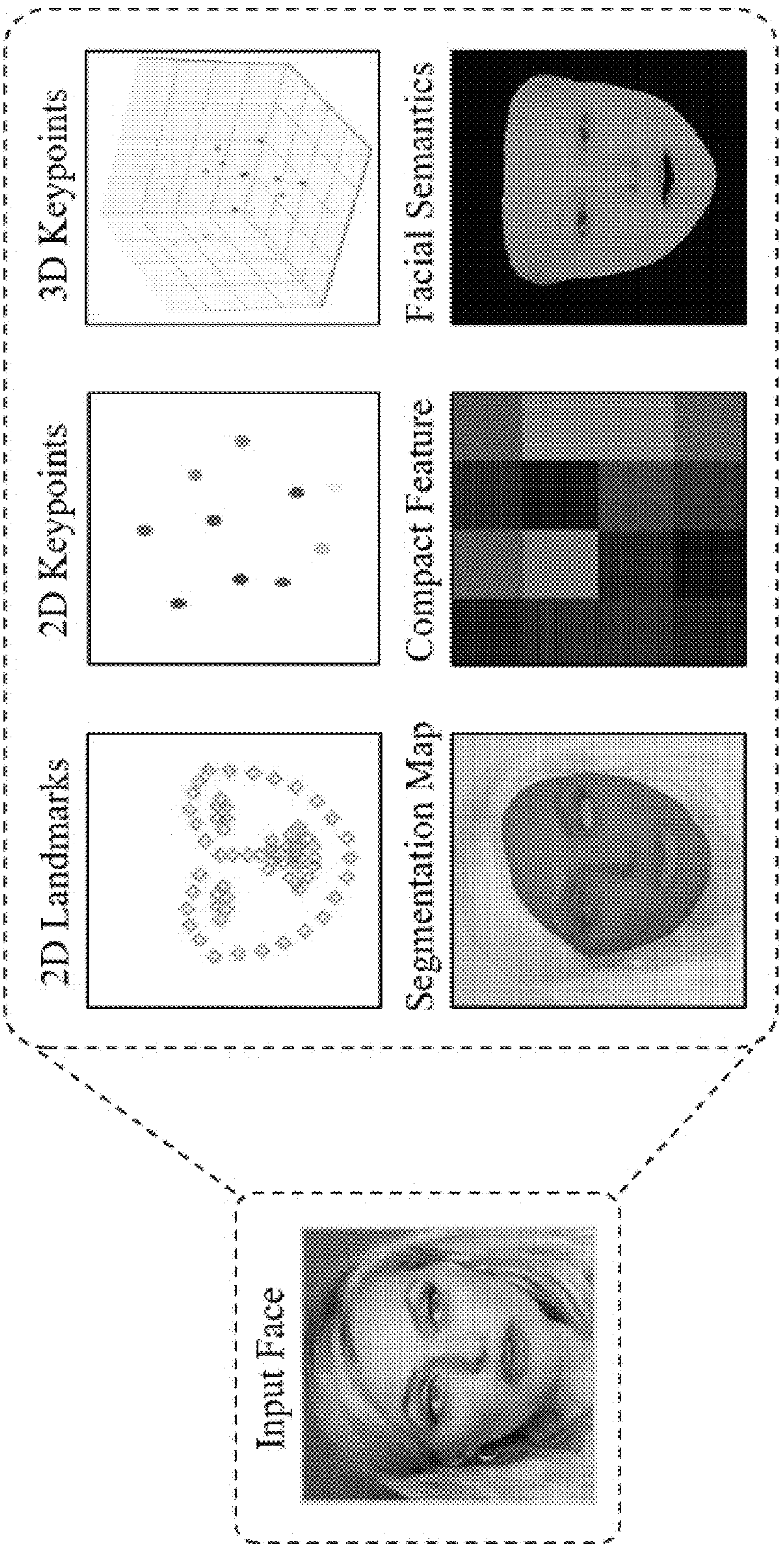
FIG. 5B is schematic diagram illustrating general facial representations for the exemplary generative face video compression system in FIG. 5A, according to some embodiments of the present disclosure.

FIG. 5A illustrates the general encoding-decoding processes of generative face video compression (GFVC) algorithms. At the encoder side, the key-reference frame of face video can be compressed by the conventional coding technique, and the subsequent inter frames can be characterized with the compact transmitted symbols by the analysis model and coded into the output bitstream. As shown in FIG. 5A, the key-reference frame can be encoded and decoded through image/video codec, while the compact facial information can be encoded and decoded through model-based codec. At the decoder side, the decoded (reconstructed) key-reference frame and compact facial information are jointly fed into the synthesis model for reconstructing the video. In this manner, face video communication can be actualized towards ultra-low bitrate and high-quality reconstruction. FIG. 5B is schematic diagram illustrating general facial representations for the exemplary generative face video compression system in FIG. 5A, according to some embodiments of the present disclosure. For example, animation models are capable of economically characterizing the input face frames with compact facial representations (e.g., 2D landmarks, 2D keypoints, 3D keypoints, compact feature, segmentation map and facial semantics as shown in FIG. 5B) and depend on the powerful learning capabilities of deep generative models to reconstruct these face frames, which have greatly advanced the progress of generative face video compression.

Although the promising rate-distortion (RD) performance can be achieved along this vein, some of these GFVC approaches are still faced with some drawbacks and challenges, limiting further performance improvements and practical applications. For example, some of these GFVC approaches with different facial representations may require a pair of specifically-trained encoder and decoder. Once the encoder and decoder do not match, the reconstruction of face video cannot be successfully achieved. Such incompatibility may reduce the practicability of these approaches and therefore cannot be supported by the commonly used image viewers in computers and mobiles.

With the rapid development of deep learning, various deep-learning-based algorithms have been introduced to replace or enhance video coding tools, including intra/inter prediction, entropy coding and in-loop filtering. Regarding the joint optimization of the entire image/video compression framework rather than designing one particular module, the end-to-end image/video compression algorithms have been proposed. For example, it has been proposed the first end-to-end video coding scheme Deep-based Video Compression (DVC) scheme that jointly optimizes all the components for video compression (e.g., Guo Lu, Wanli Ouyang, Dong Xu, Xiaoyun Zhang, Chunlei Cai, and Zhiyong Gao, "DVC: An end-to-end deep video compression framework," in IEEE/CVF Conference on Computer Vision and Pattern Recognition, 2019). Furthermore, it has been considered the content adaptive and error propagation aware problems and developed an online encoder updating scheme to improve the video compression performance. In addition, face video compression (FVC) is proposed by developing all major modules of the end-to-end compression framework in the feature space. Based on recurrent probability model and weighted recurrent quality enhancement network, it has been proposed the Recurrent Learning for Video Compression (RLVC) and Hierarchical Learned Video Compression (HLVC) to fully exploit the temporal correlation among video frames. Four effective modules are introduced in Multiple Frames Prediction for Learned Video Compression (M-LVC). However, these traditional or learning-based video compression methods aim at the universal natural scenes without the specific consideration of the human content, such as face, body, or other parts.

Figure 5C:
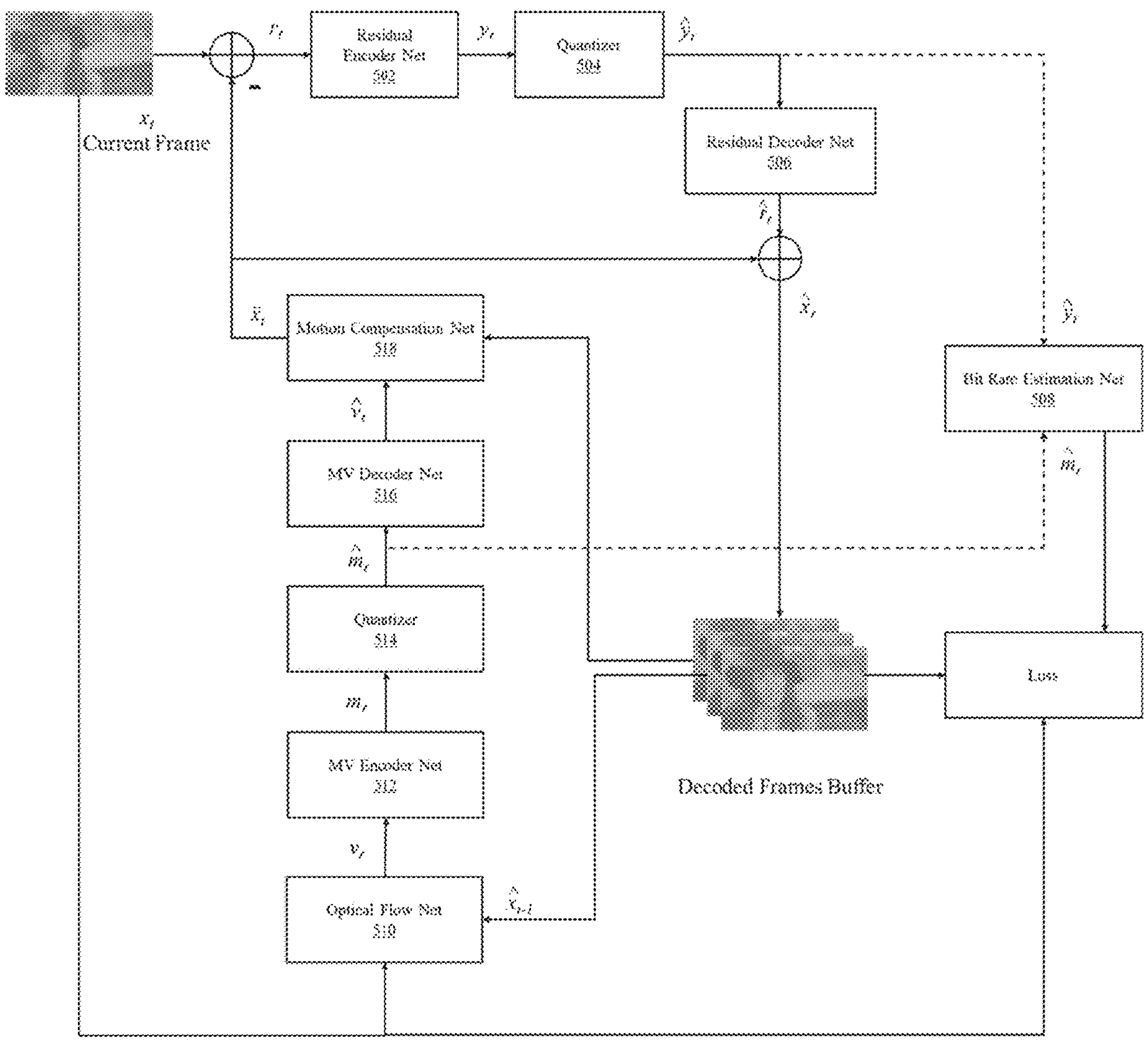
FIG. 5C is a schematic diagram illustrating an exemplary architecture of an end-to-end deep-based video compression framework, according to some embodiments of the present disclosure.

FIG. 5C is a schematic diagram illustrating an exemplary architecture of an end-to-end deep-based video compression framework, according to some embodiments of the present disclosure. As shown in FIG. 5C, encoding process 500 can be realized by one or more processors associated with an encoder (e.g., image/video encoder 124 in FIG. 1, image/video encoder conducting encoding process 200A of FIG. 2A, image/video encoder conducting encoding process 200B of FIG. 2B, or apparatus 400 in FIG. 4), while a decoding process corresponding to encoding process 500 can be realized by one or more processors associated with a decoder (e.g., image/video decoder 144 in FIG. 1, image/video decoder conducting decoding process 300A of FIG. 3A, image/video decoder conducting decoding process 300B of FIG. 3B, or apparatus 400 in FIG. 4).

First, as shown in FIG. 5C, motion estimation and compression—a CNN model (e.g., Optical Flow Net 510 shown in FIG. 5C) can be used to estimate the optical flow, which is considered as motion information $v_t$. Instead of directly encoding the raw optical flow values, an MV encoder-decoder network (e.g., a network including MV Encoder Net 512, Quantizer 514, and MV Decoder Net 516 shown in FIG. 5C) to compress and decode the optical flow values, in which the encoded motion information is denoted as $m_t$ and the quantized motion representation is denoted as $\hat{m}_t$. Then the corresponding reconstructed motion information $\hat{v}_t$ can be decoded by using the MV Decoder Net 516.

Second, motion compensation—a motion compensation network (e.g., Motion Compensation Net 518 shown in FIG. 5C) is designed to obtain the predicted frame $\tilde{x}_t$ based on the optical flow.

Third, transform, quantization and inverse transform—the linear transform in the traditional video compression framework (e.g., encoding process 200A in FIG. 2A) can be replaced by a highly non-linear residual encoder-decoder network, and the residual $r_t$ is non-linearly mapped to the representation $y_t$ by Residual Encoder Net 502. Then $y_t$ is quantized to $\hat{y}_t$ by quantizer 504. In order to build an end-to-end training scheme, the quantization method is used (e.g., Johannes Balle, Valero Laparra, and Eero Simoncelli, "End-to-end optimized image compression," in ICLR, 2016). The quantized representation $\hat{y}_t$ is fed into the Residual Decoder Net 506 to obtain the reconstructed residual $\hat{r}_t$.

Fourth, entropy coding—at the testing stage, the quantized motion representation $\hat{m}_t$ and the residual representation $\hat{y}_t$ can be coded into bits and sent to the decoder (not shown in FIG. 5C). At the training stage, to estimate the number of bits cost, the CNNs are used to obtain the probability distribution of each symbol in $\hat{m}_t$ and $\hat{y}_t$.

Fifth, frame reconstruction—it can be the same as the traditional method to obtain the decode frames stored in the decode frames buffer.

Figure 6:
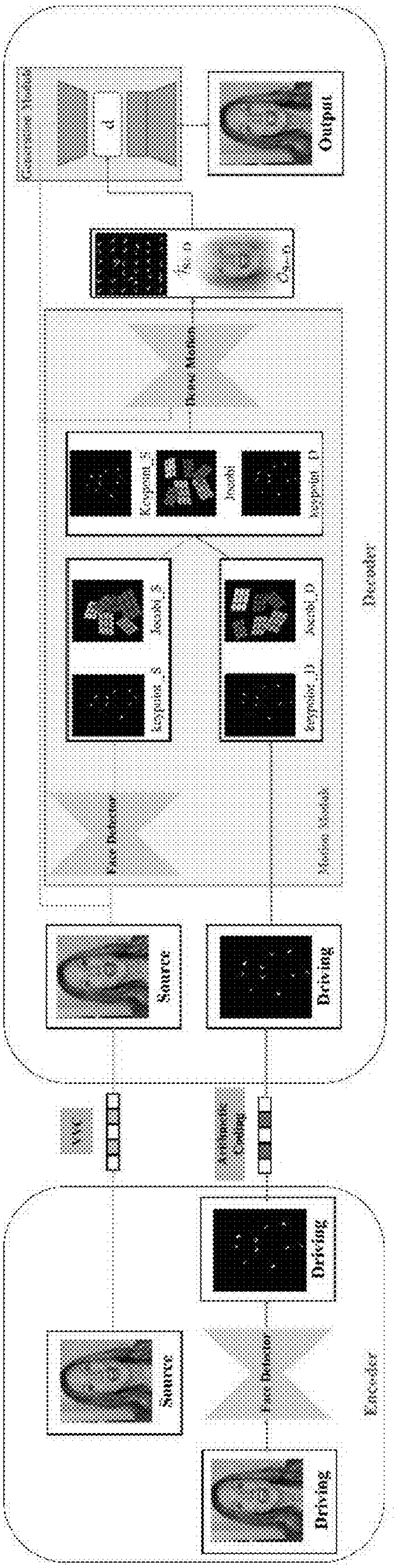
FIG. 6 is a schematic diagram illustrating an exemplary architecture of a deep-based video generative compression framework, according to some embodiments of the present disclosure.

FIG. 6 illustrates the basic framework of the deep-based video generative compression scheme based First Order Motion Model (FOMM). The FOMM may deform a reference source frame to follow the motion of a driving video (e.g., Aliaksandr Siarohin, Stephane Lathuiliere, Sergey Tulyakov, Elisa Ricci, and Nicu Sebe, "First order motion model for image animation," Advances in Neural Information Processing Systems, vol. 32, pp. 7137-7147, 2019). This method may work on various types of videos (e.g., Tai-chi, cartoons, and the face animation application). FOMM follows an encoder-decoder architecture with a motion transfer component.

For example, in the FOMM encoder-decoder architecture, a keypoint extractor can be learned using an equivariant loss, without explicit labels. By this keypoint extractor, two sets of ten learned keypoints are computed for the source and driving frames. The learned keypoints is transformed from the feature map with the size of channel 64×64 via the Gaussian map function, thus every corresponding keypoint can represent different channels' feature information. In the above description, every keypoint is point of (x, y) that can represent the most important information of feature map.

As another example, in the FOMM encoder-decoder architecture, a dense motion network uses the landmarks and the source frame to produce a dense motion field and an occlusion map.

As another example, in the FOMM encoder-decoder architecture, the encoder encodes the source frame via the traditional image/video compression method, such as HEVC/VVC or JPEG/BPG. Here, the VVC is used to compress the source frame.

As another example, in the FOMM encoder-decoder architecture, the resulting feature map is warped using the dense motion field (using a differentiable grid-sample operation), then multiplied with the occlusion map.

As another example, in the FOMM encoder-decoder architecture, the decoder generates an image from the warped map.

Figure 7:
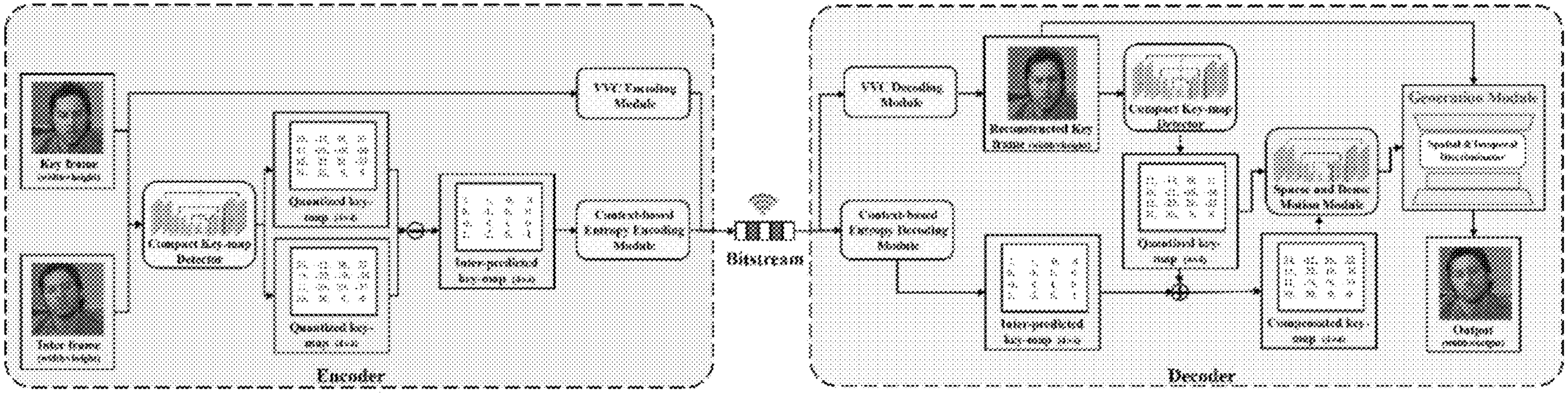
FIG. 7 is a schematic diagram illustrating an exemplary talking face video encoder-decoder coding framework with a 1×4×4 compact feature size, according to some embodiments of the present disclosure.

FIG. 7 gives another basic framework of the deep-based video generative compression scheme based on compact feature representation, namely CFTE as known (e.g., Nagrani A, Chung J S, Zisserman A. Voxceleb: a large-scale speaker identification dataset [J]. arXiv preprint arXiv: 1706.08612, 2017). The framework in FIG. 7 follows an encoder-decoder architecture.

As shown in FIG. 7, at the encoder side, the compression framework consists of three modules: an encoder for compressing the key frame, a feature extractor for extracting the compact human features of the other inter frames, and a feature coding module for compressing the inter-predicted residuals of compact human features. First, the key frame which represents the human textures is compressed with the VVC encoder. Through the compact feature extractor, each of the subsequent inter frames is represented with a compact feature matrix with the size of 1×4×4. In the above description, the size of compact feature matrix is not fixed, and the number of feature parameters can also be increased or decreased according to the specific requirement of bit consumption. Then, these extracted features are inter-predicted and quantized, and the residuals are finally entropy-coded as the final bitstream.

As shown in FIG. 7, at the decoder side, this compression framework also contains three main modules, including decoding for reconstructing the key frame, the reconstruction of the compact features by entropy decoding and compensation, and the generation of the final video by leveraging the reconstructed features and decoded key frame. More specifically, during the generation of the final video, the decoded key frame from the VVC bitstream can be further represented in the form of features through compact feature extraction. Subsequently, given the features from the key and inter frames, relevant sparse motion field is calculated, facilitating the generation of the pixel-wise dense motion map and occlusion map. Finally, based on deep generative model, the decoded key frame, pixel-wise dense motion map and occlusion map with implicit motion field characterization are used to produce the final video with accurate appearance, pose, and expression.

Although the promising rate-distortion (RD) performance can be achieved by the generative face video compression diagrams, they are still faced with some drawbacks and challenges, limiting further performance improvements and practical applications. In particular, each of these GFVC approaches with different facial representations requires a pair of specifically-trained encoder and decoder. Once the encoder and decoder do not match, the reconstruction of face video cannot be successfully achieved. Such incompatibility may reduce the practicability of these approaches and therefore cannot be supported by the commonly used image viewers in computers and mobiles. As such, it is important to design a common translator to be compatible with different facial representations from different GFVC encoders when the decoder is fixed.

The present disclosure provides a method leveraging plug-in face feature translator that can convert different types of face feature between each other. The overall structure of generative face video coding with proposed face feature translator system is shown in FIG. 8.

Figure 8:
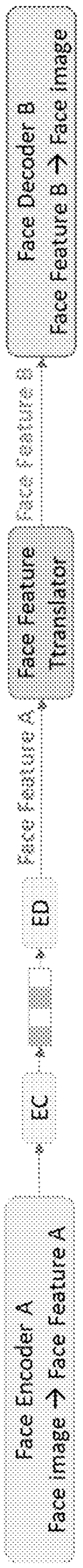
FIG. 8 is a schematic diagram illustrating generative face video coding with an exemplary face feature translator, according to some embodiments of the present disclosure.

As shown in FIG. 8, at the encoder side, face feature is first extracted and entropy coded by face encoder A to its corresponding format, such as 2D key point, 3D key point, compact feature, denoted as face feature A. At the decoder side, face feature A is entropy decoded. As for fixed decoder scenario, the decoder is designated to decode facial picture from face feature of type B, received arbitrary type of face feature A should be translated to face feature B using the face translator while maintaining reconstruction quality of ultimate face generation. As can be appreciated, the translator can be deemed as a part of the decoder. The detailed description is given as follows.

Specifically, input facial picture of GFVC system is denoted as x, and is encoded to face feature A by face encoder A, $$f_A = \varepsilon_A(x)$$

where $\varepsilon_A$ and $f_A$ denotes face encoder and its extracted feature respectively.

Then, the face feature is entropy encoded, transmitted to decoder side to be entropy decoded, $$\hat{f}_A = DC(EC(f_A))$$

where EC, DC denote entropy encoding and decoding respectively.

Before face decoding, the face feature can be translated to designated type by proposed face feature translator, $$\tilde{f}_B = T(\hat{f}_A)$$

where T stands for a translation operation, $\tilde{f}_B$ is a translated feature of $\hat{f}_A$.

Finally, the face can be generatively decoded by decoder B, $$\hat{x} = \delta_B(\tilde{f}_B)$$

where $\delta_B$ and $\hat{x}$ denotes face decoder and its reconstructed facial picture respectively.

Figure 9:
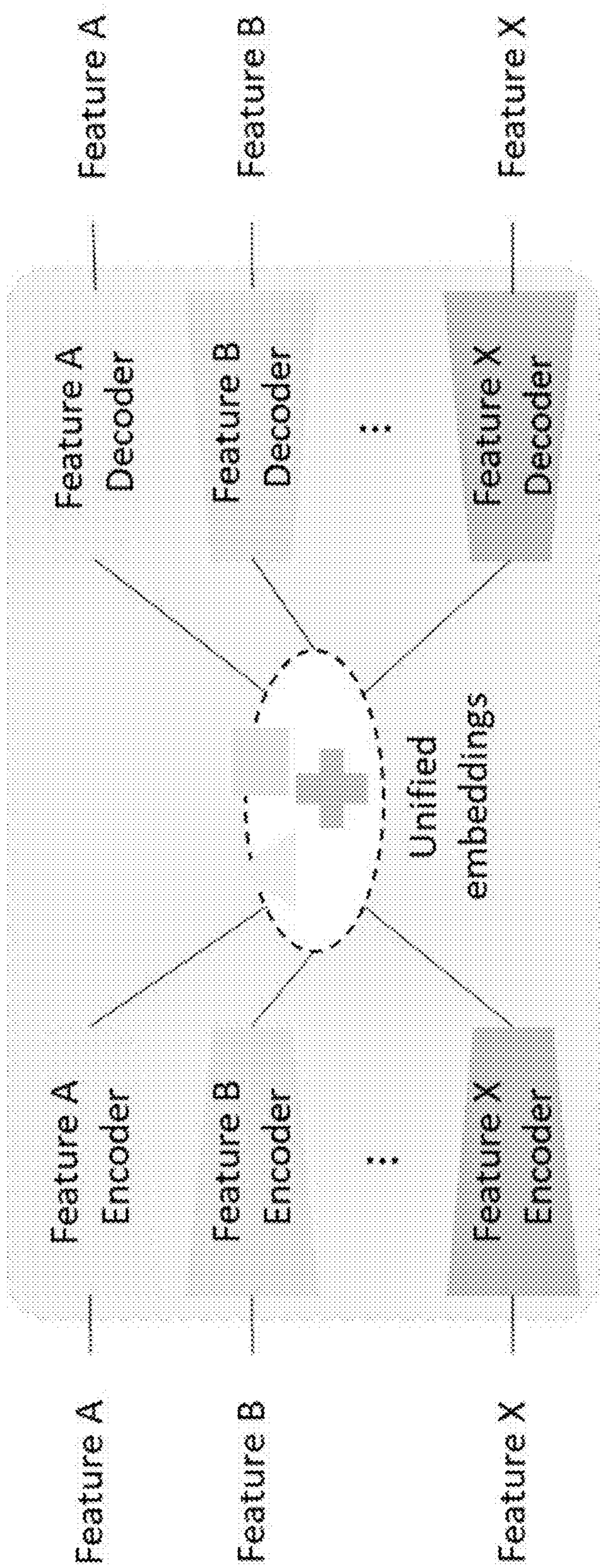
FIG. 9 is a schematic diagram illustrating an exemplary face feature translator, according to some embodiments of the present disclosure.

To better support fixed decoder scenario and keep the generality of GFVC approach, in some embodiments, the common face feature translator can be used to achieve feature translation between arbitrary two types, as shown in FIG. 9.

In some embodiments, for generative face video compression system that support total N types of face feature, multi-input multi-output network can be used to complete the translation with N feature encoders to transform different face features to unified embeddings in a common plane with the same dimension. Then, for every desired face feature, the corresponding decoder can recover the face feature from unified embeddings. The transform of the $i^{th}$ feature can be described as:

$$\text{embedds}_i = T_{enc,i}(\hat{f}_i)$$

where $\text{embedds}_i$ and $T_{enc,i}$ denote the unified embedding from $i^{th}$ feature and encoder for $i^{th}$ feature, and $\hat{f}_i$ denotes the reconstructed $i^{th}$ feature.

The transform to the $j^{th}$ feature can be described as:

$$\tilde{f}_J = T_{dec,j}(\text{embedds}_i)$$

where $T_{dec,j}$ denotes decoder for $j^{th}$ feature, and $\tilde{f}_J$ denotes the translated $j^{th}$ feature. Thus, the translation between face feature can be described as:

$$T_{i\to j/\{i\}} = T_{enc,i} \circ T_{dec,j/\{i\}}.$$

In some embodiments, model supervision and loss function can be used for the disclosed face feature translator. To optimize the disclosed face feature translator, training data can be prepared by extracting face features with different GFVC models and obtain different types of face features. The different GFVC models and corresponding face features can be 2D keypoints from First Order Motion Model (FOMM), 3D keypoints from Face_vid2vid, compact feature from Compact Feature for Temporal Evolution (CFTE), facial semantics from Interactive Face Video Coding (IFVC), and so on. During training, to ensure that the translation between original feature and designated feature is injective and surjective, the feasible translation is grouped in an "after n" manner. Specifically, for system with N available face features, the "after n" interval can be chosen from 1 to N−1. For a chosen interval t, the feasible translation pairs are:

$$\mathcal{F}_t = \{T_{i\to(i+t)\%N},\ i \in [1, N]\},$$

then the whole feasible translation sets can be described as:

$$\mathcal{F} = \{\mathcal{F}_t,\ t \in [1, N-1]\}.$$

During Training, the disclosed method can random sample K subset from set $\mathcal{F}$ and calculate the L1 loss between transformed designated features and its ground truth label. The loss function can be described as $$\text{Loss} = \sum_{k=1}^{K} \sum_{n=1}^{N} \left\| T_{n\to(n+t_k)\%N}(f_n) - f_{(n+t_k)\%N} \right\|_1$$

During implementation, for translation between feature i and j, the disclosed method can use encoder i and decoder j as $$\tilde{f}_J = T_{dec,j}(T_{enc,i}(f_i)),$$

so that the proposed face feature translator can support GFVC system with arbitrary encoding face feature format and arbitrary fixed designated feature format for decoding.

Some embodiments of the present disclosure provide a scheme of using a face feature translator for generative face video compression, which can convert the different decoding facial representations between each other for supporting the fixed decoder and generating the face video. The proposed scheme can achieve the practicability of these existing GFVC approaches and support the commonly used image decoder in computers and mobiles.

Some embodiments of the present disclosure propose to optimize proposed face feature translator with injective and surjective "after n" translation pairs grouping, so that every single face encoder and decoder can be equally optimized, and every possible translation pair can be equally executed to ensure the overall precision of face feature translation and to benefit its general usage for GFVC system.

Some embodiments of the present disclosure use the disclosed face feature translator for generative face video compression, it is contemplated that the disclosed face feature translator can also be used in other learning-based compression schemes. For example, the existing end-to-end compression algorithms also requires a pair of specifically-trained encoder and decoder, which is not suitable for practical applications. Therefore, the disclosed face feature translator can be effectively extended to end-to-end coding, where the features from different E2E encoders can be effectively transcoded to support the image/video reconstruction of fixed decoder.

Figure 10:
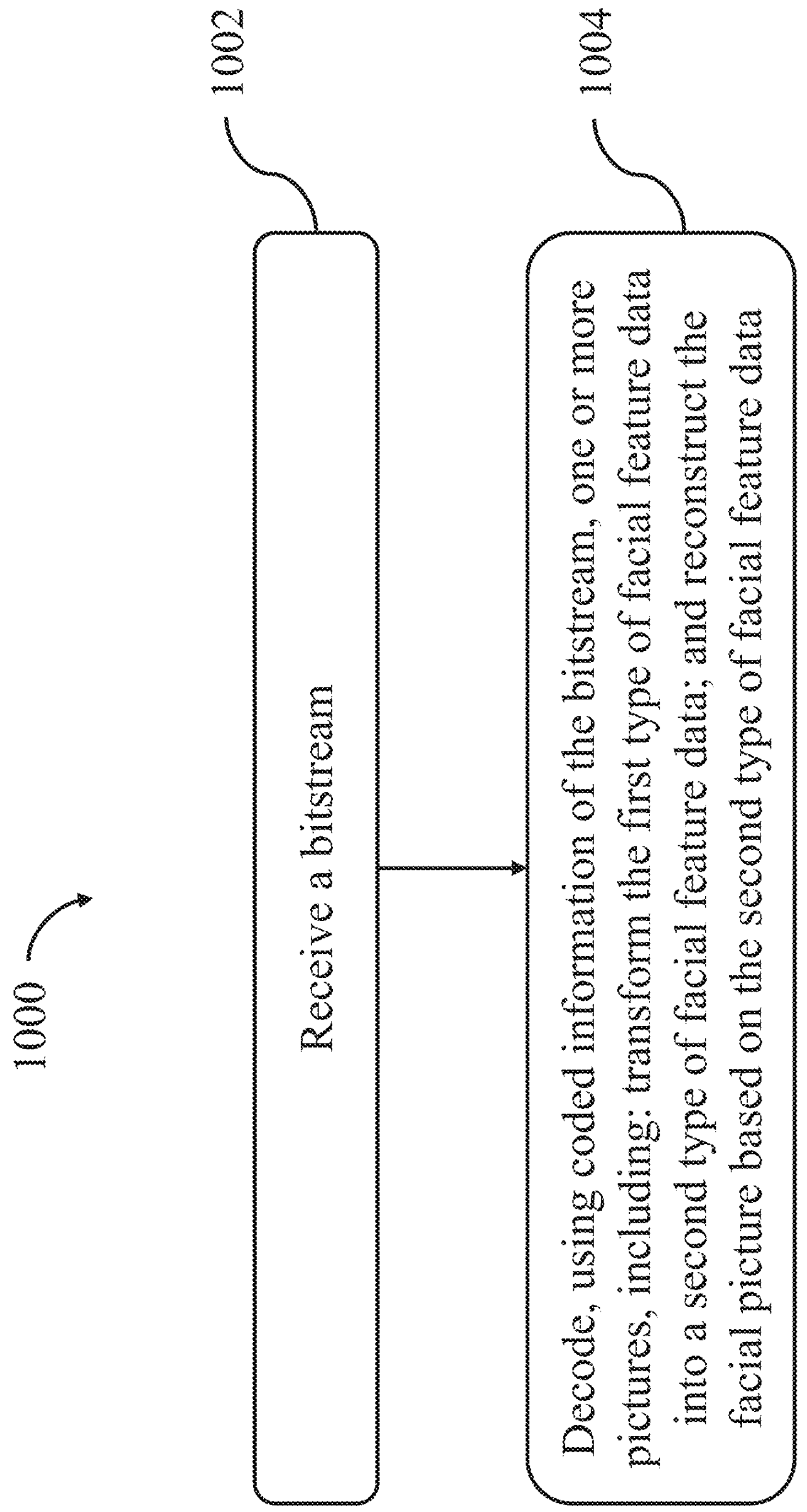
FIG. 10 is a flow chart illustrating an exemplary method of decoding a bitstream to output one or more pictures for a video stream, according to some embodiments of the present disclosure.

Some embodiments of the present disclosure provide a method of decoding a bitstream. FIG. 10 is a flow chart illustrating an exemplary method 1000 of decoding a bitstream to output one or more pictures for a video stream, according to some embodiments of the present disclosure. As shown in FIG. 10, method 1000 may include steps 1002 and 1004, which can be implemented by one or more processors associated with a decoder (e.g., image/video decoder 144 in FIG. 1, image/video decoder conducting decoding process 300A of FIG. 3A, image/video decoder conducting decoding process 300B of FIG. 3B, or apparatus 400 in FIG. 4).

In step 1002, the decoder may receive a bitstream associated with a first type of facial feature data representing a facial picture. For example, the bitstream may include coded information of the first type of facial feature data or coded information that is processed based on the first type of facial feature data. In some embodiments, the first type of facial feature data can be represented by 2D Landmarks, 2D keypoints, 3D keypoints, segmentation map, compact feature, or facial semantics. It is appreciated that these formats for representing facial feature are listed for illustration only, other formats can also be applied as an alternative.

In step 1004, the decoder may decode one or more pictures using coded information of the bitstream. Specifically, the decoder may transform the first type of facial feature data into a second type of facial feature data and reconstruct the facial picture based on the second type of facial feature data in step 1004. That is, the decoder may reconstruct the facial picture based on the transformed information of facial feature data signaled in the bitstream.

In some embodiments, the decoder may be specified to a particular type of facial feature data and decode thereof. Therefore, the received bitstream associated with the first type of facial feature data may need to be transformed to a format that applies to the decoder. In some embodiments, the first type of facial feature data can be transformed into the second type of facial feature data, which is organized in a format different from the first type of facial feature data. Each of the first type of facial feature data and the second type of facial feature data can be represented by 2D Landmarks, 2D keypoints, 3D keypoints, segmentation map, compact feature, or facial semantics. In some embodiments, the decoder may include a translator implemented by a neural network to realize the translation work.

It is appreciated method 1000 implemented by the decoder (hereinafter, specifically the translator) can process coded information of various types of facial feature data. That is, the decoder can apply to different kinds of facial feature data regardless of the coding format used at the encoder side. In this manner, the decoder can be a universal decoder.

Figure 11:
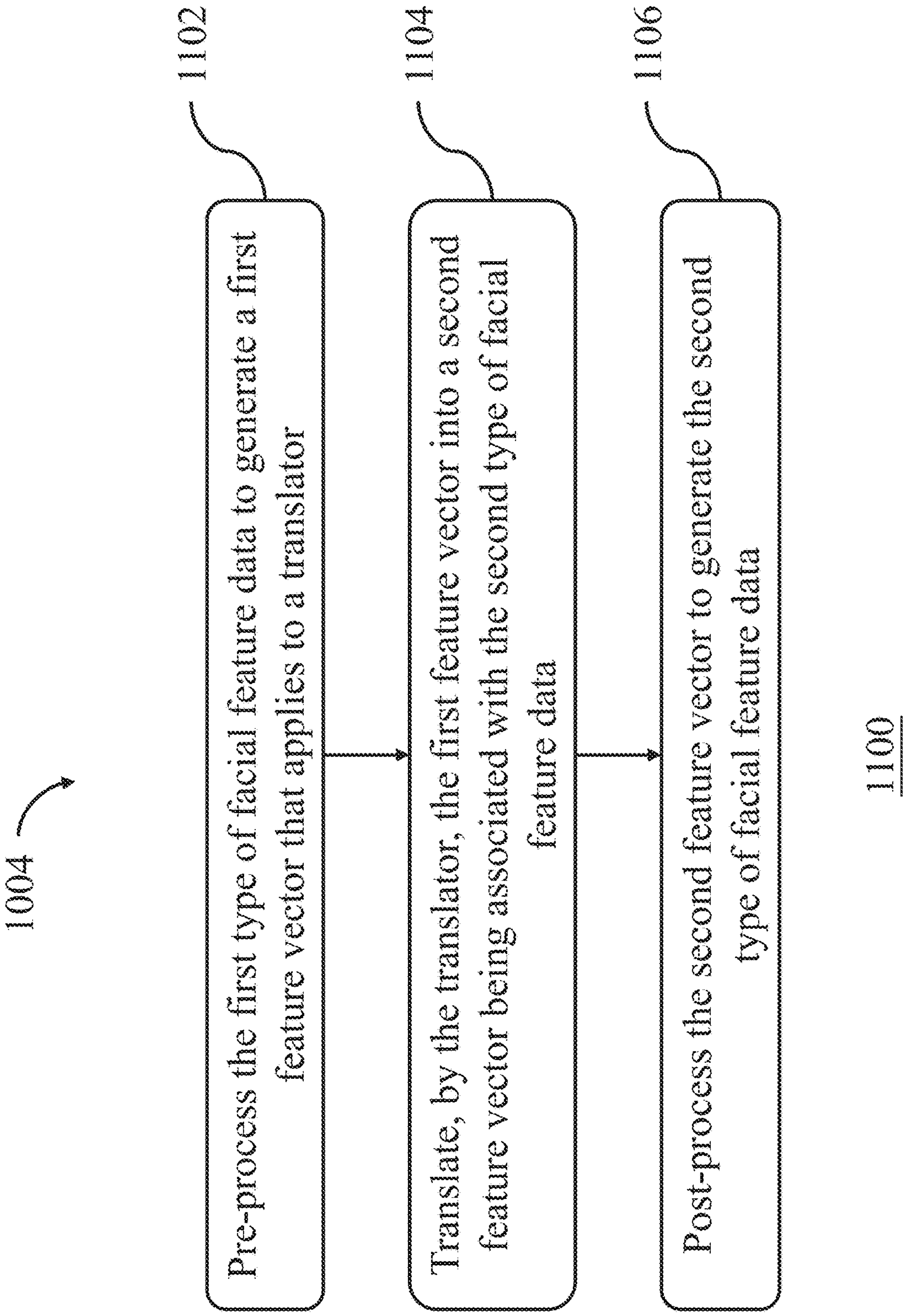
FIG. 11 is a flow chart illustrating sub-steps of the exemplary method shown in FIG. 10, according to some embodiments of the present disclosure.

FIG. 11 is a flow chart illustrating sub-steps of method 1000 shown in FIG. 10, according to some embodiments of the present disclosure. As method 1100 shown in FIG. 11, step 1004 may include sub-steps 1102 to 1106, which can be implemented by the decoder.

In sub-step 1102, the decoder may pre-process the first type of facial feature data to generate a first feature vector that applies to a translator. Herein, the first type of facial feature data may not apply to the translator directly and a pre-processing thereof may be needed. The translator can be a part of the decoder either integrated into the decoder or physically separated from the decoder. In some embodiments, the first feature vector can be organized in a specific manner applied to the translator. For example, the translator may be able to receive the first feature vector through an input of the input layer of the translator and separate, e.g., based on flags within the vector, the vector into several segments that are fed into the hidden layers of the translator.

In sub-step 1104, the decoder may translate, by the translator, the first feature vector into a second feature vector being associated with the second type of facial feature data. In some embodiments, the translator can output the second feature vector through an output of the output layer of the translator. Similarly, the second feature vector can be organized in a specific manner.

In sub-step 1106, the decoder may post-process the second feature vector to generate the second type of facial feature data. As can be appreciated, the output second feature vector may not be suitable for reconstructing a facial picture as the second feature vector may not be inconsistent with the standard for encoding and decoding a facial picture. Herein, the post-processing can be an inverse procedure of the pre-processing as they temps to realized opposite purposes. As can be also appreciated, the pre-processing is conducted prior to the feeding of data into the translator while the post-processing is conducted subsequent to the output of data from the translator. That is, "pre" and "post" herein are described with respect to the operation of the translator.

In some embodiments, the translator used to translate the first feature vector into the second feature vector can be pre-trained. For example, the translator can be trained by a first set of samples as input organized in a format consistent with the first type of facial feature data and a corresponding second set of samples as target output organized in a format consistent with the second type of facial feature data, wherein the first set of samples and the second set of samples can be used to represent a common facial picture. In particular, the translator can be trained by a first set of samples organized in a format of the first feature vector and a corresponding second set of samples organized in a format of the second feature vector. In other words, the common facial picture can be firstly expressed by a first type of facial feature data and a second type of facial feature data. Then, the first type of facial feature data can be transformed into the first set of samples organized in a format of the first feature vector and the second type of facial feature data can be transformed into the second set of samples organized in a format of the second feature vector. When training the translator, the first set of samples can be fed into the input layer of the translator and the second set of samples can be used as the target output of the output layer of the translator.

As described above, the translator can be a universal translator. Hence, the translator can be trained by facial feature data, which is also used to represent the common facial picture, other than the first type of facial feature data and the second type of facial feature data.

Figure 12:
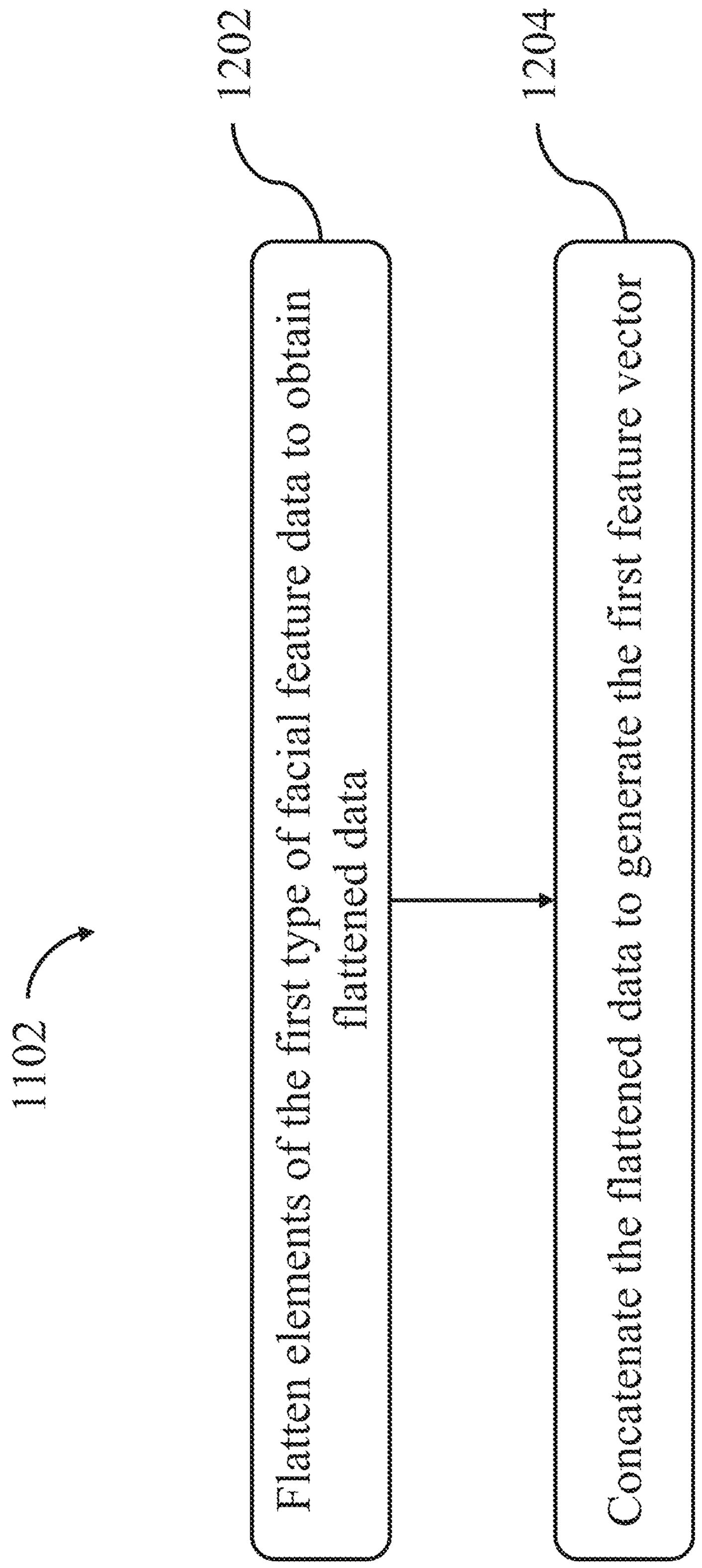
FIG. 12 is a flow chart illustrating sub-steps of the exemplary method shown in FIG. 11, according to some embodiments of the present disclosure.

FIG. 12 is a flow chart illustrating sub-steps of method 1100 shown in FIG. 11, according to some embodiments of the present disclosure. As method 1200 shown in FIG. 12, sub-step 1102 of pre-processing may include sub-steps 1202 and 1204, which can be implemented by the decoder.

In sub-step 1202, the decoder may flatten elements of the first type of facial feature data to obtain flattened data. In some embodiments, the first type of facial feature data may include a plurality of arrays representing the facial picture, and the flattened data may include a plurality of vectors respectively corresponding to the arrays.

In sub-step 1204, the decoder may concatenate the flattened data to generate the first feature vector. The generated first feature vector can then be applied to the translator.

Figure 13:
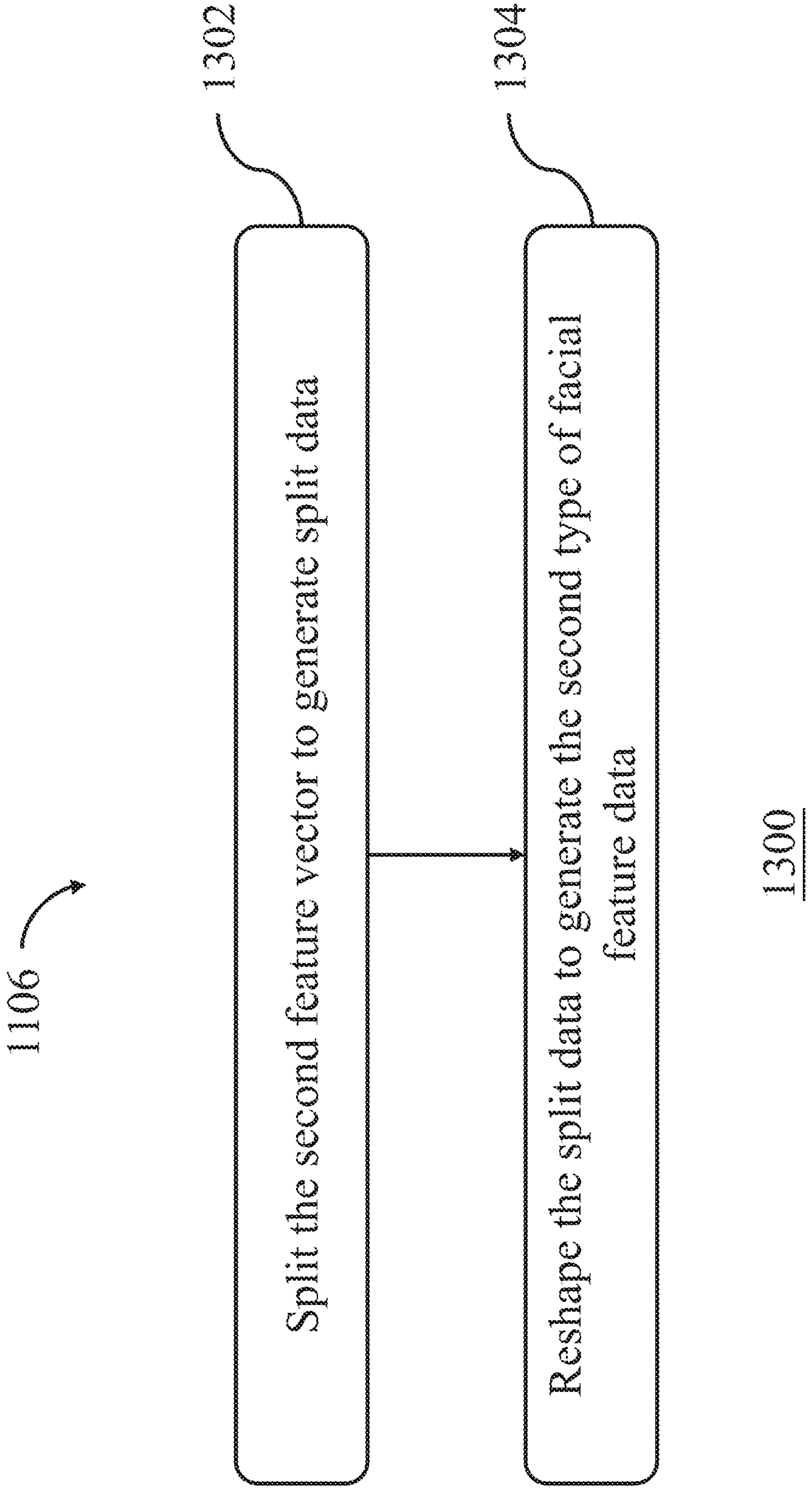
FIG. 13 is a flow chart illustrating sub-steps of the exemplary method shown in FIG. 11, according to some embodiments of the present disclosure.

FIG. 13 is a flow chart illustrating sub-steps of method 1100 shown in FIG. 11, according to some embodiments of the present disclosure. As method 1300 shown in FIG. 13, sub-step 1106 of post-processing may include sub-steps 1302 and 1304, which can be implemented by the decoder.

In sub-step 1302, the decoder may split the second feature vector to generate split data. The output second feature vector may not apply to the decoder, thus needs post-processing (e.g., splitting and reshaping).

In sub-step 1304, the decoder may reshape the split data to generate the second type of facial feature data. In some embodiments, the split data may include a plurality of vectors, and the second type of facial feature data may include a plurality of arrays respectively corresponding to the plurality of vectors.

In some embodiments, the bitstream may include entropy coded data of the first type of facial feature data. Step 1004 of FIG. 10 may further include a sub-step (not shown in FIG. 11) of entropy decoding the bitstream to obtain the first type of facial feature data.

Figure 14:
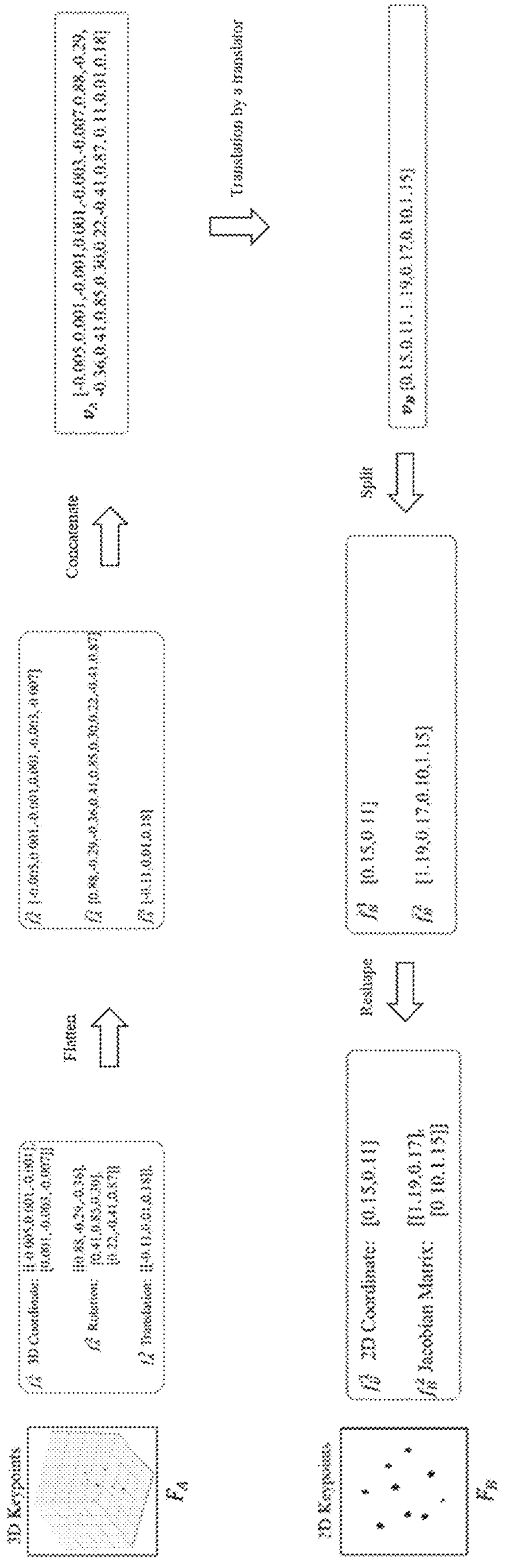
FIG. 14 is a schematic diagram illustrating the exemplary method shown in FIG. 10, according to some embodiments of the present disclosure.

FIG. 14 is a schematic diagram illustrating method 1000 shown in FIG. 10, according to some embodiments of the present disclosure. As shown in FIG. 14, the generated facial feature data at the encoder side can be represented by 3D keypoints, while the decoder may adopt facial feature data represented by 2D keypoints. Thus, a transformation from 3D keypoints to 2D keypoints is needed.

In some embodiments, the decoder may flatten elements of facial feature data $F_A$ represented by 3D keypoints (e.g., including 3D coordinate array $$f_A^1$$

[[−0.005, 0.001, −0.001], [0.001, −0.003, −0.007]], rotation array $$f_A^2$$

[[0.88, −0.29, −0.36], [0.41, 0.85, 0.30], [0.22, −0.41, 0.87]], and translation array $$f_A^3$$

[[−0.11, 0.01, 0.18], . . . ]) of a facial picture to obtain flattened data. As can be appreciated, FIG. 14 only illustrates a part of the facial feature data for illustrative purposes. The flattened data of facial feature data $F_A$ may include vector $$\bar{f}_A^1$$

[−0.005, 0.001, −0.001, 0.001, −0.003, −0.007], vector $$\bar{f}_A^2$$

[0.88, −0.29, −0.36, 0.41, 0.85, 0.30, 0.22, −0.41, 0.87], and vector $$\bar{f}_A^3$$

[−0.11, 0.01, 0.18]. Next, the decoder may concatenate the flattened data to generate feature vector $v_A$ [−0.005, 0.001, −0.001, 0.001, −0.003, −0.007, 0.88, −0.29, −0.36, 0.41, 0.85, 0.30, 0.22, −0.41, 0.87, −0.11, 0.01, 0.18]. Feature vector $v_A$ can be fed into the translator. An output feature vector $v_B$ [0.15, 0.11, 1.19, 0.17, 0.10, 1.15] corresponding to feature vector $v_A$ can be generated by the translator. The decoder may then split feature vector $v_B$ to generate split data including vector $$\bar{f}_B^1$$

[0.15, 0.11] and vector $$\bar{f}_B^2$$

[1.19, 0.17, 0.10, 1.15]. Eventually, the decoder may reshape vector $$\bar{f}_B^1$$

[0.15, 0.11] and vector $$\bar{f}_B^2$$

[1.19, 0.17, 0.10, 1.15] to generate facial feature data $F_B$ represented by 2D keypoints (e.g., including 2D coordinate array $$f_B^1$$

[0.15, 0.11] and Jacobian Matrix $f_B^2$

[[1.19, 0.17], [0.10, 1.15]]). As can be appreciated, matrix and array herein may refer to a same data structure and may be used interchangeably.

According to some embodiments described above, the pre-processing of data is conducted at the decoder side. In some embodiments, at least a part of the pre-processing can be conducted at the encoder side while the post-processing is still conducted at the decoder side. For example, in some embodiments, the bitstream may include entropy coded data of the flattened data, which is generated by flattening elements of the first type of facial feature data. Step 1004 may further include a sub-step (not shown in FIG. 11) of entropy decoding the bitstream to obtain the flattened data. That is, a part of the pre-processing can be conducted at the encoder side.

As such, step 1004 of transforming the first type of facial feature data into the second type of facial feature data may include: concatenating flattened data to generate a first feature vector that applies to a translator; translating, by the translator, the first feature vector into a second feature vector being associated with the second type of facial feature data; splitting the second feature vector to generate split data; and reshaping the split data to generate the second type of facial feature data.

In some embodiments, the bitstream may include entropy coded data of the first feature vector. The first feature vector can be concatenated from flattened data that is generated by flattening elements of the first type of facial feature data. Step 1004 may further include sub-step (not shown in FIG. 11) of entropy decoding the bitstream to obtain the first feature vector. That is, the pre-processing can be conducted at the encoder side.

Then, step 1004 of transforming the first type of facial feature data into the second type of facial feature data may include: translating, by a translator, a first feature vector being associated with the first type of facial feature data into a second feature vector being associated with the second type of facial feature data; splitting the second feature vector to generate split data; and reshaping the split data to generate the second type of facial feature data.

Figure 15:
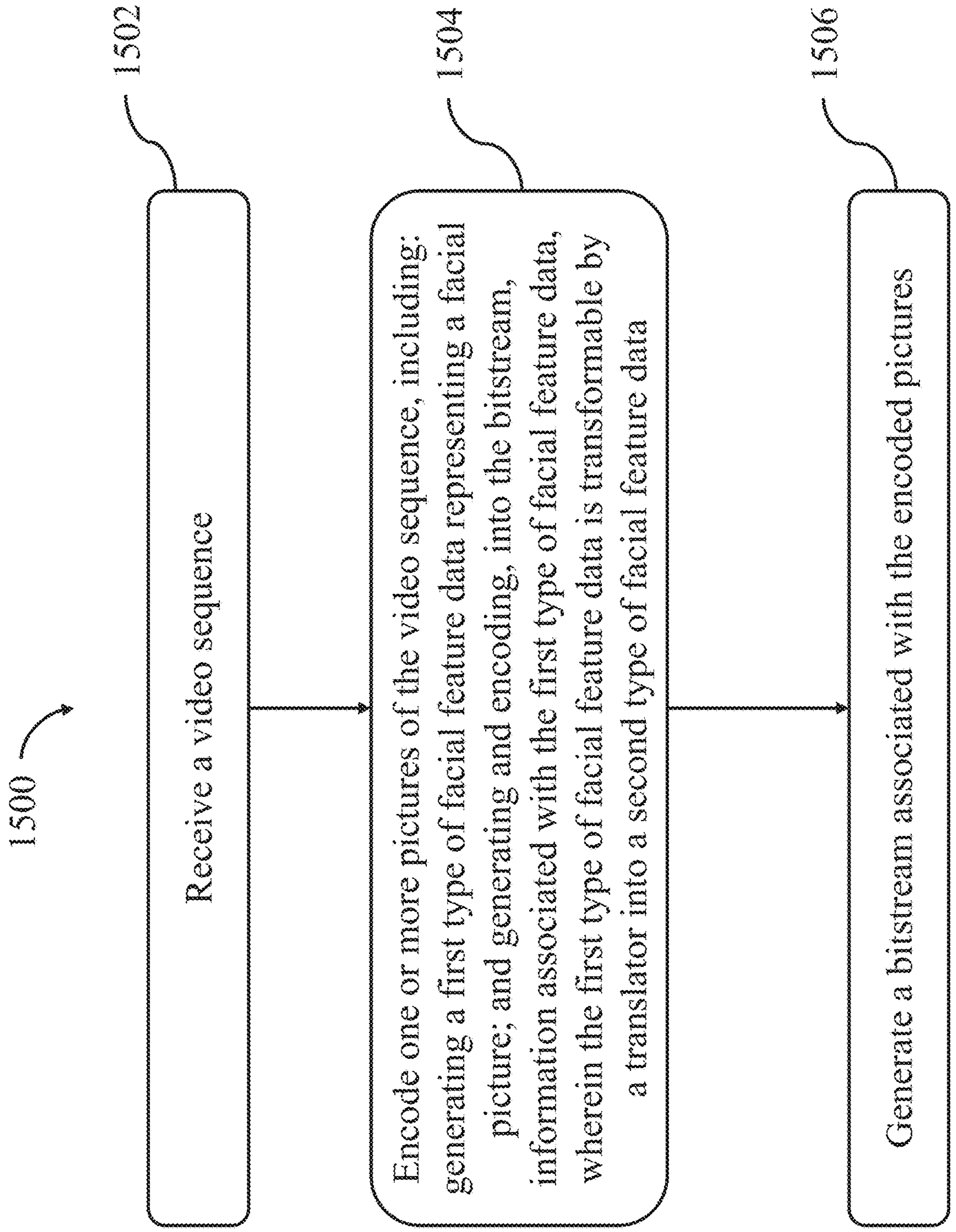
FIG. 15 is a flow chart illustrating an exemplary method of encoding a video sequence into a bitstream, according to some embodiments of the present disclosure.

Some embodiments of the present disclosure provide a method of encoding a video sequence. FIG. 15 is a flow chart illustrating an exemplary method 1500 of encoding a video sequence into a bitstream, according to some embodiments of the present disclosure. As shown in FIG. 10, method 1500 may include steps 1502 to 1506, which can be implemented by one or more processors associated with an encoder (e.g., image/video encoder 124 in FIG. 1, image/video encoder conducting encoding process 200A of FIG. 2A, image/video encoder conducting encoding process 200B of FIG. 2B, or apparatus 400 in FIG. 4).

In step 1502, the encoder may receive a video sequence.

In step 1504, the encoder may encode one or more pictures of the video sequence. Specifically, the encoder may generate a first type of facial feature data representing a facial picture and generate and encode, into the bitstream, information associated with the first type of facial feature data, wherein the first type of facial feature data is transformable by a translator into a second type of facial feature data In step 1506, the encoder may generate a bitstream associated with the encoded pictures. The bitstream may include the encoded results generated in step 1504.

In some embodiments, the bitstream may include entropy coded data of the first type of facial feature data. The encoder may generate the bitstream regardless of the functionality, structure, or configuration of the decoder.

As described above, in some embodiments, at least a part of the pre-processing can be conducted at the encoder side while the post-processing can be conducted at the decoder side. For example, the bitstream may include entropy coded data of flattened data that is generated by flattening elements of the first type of facial feature data. In some embodiments, the bitstream may include entropy coded data of a first feature vector that applies to the translator, and the first feature vector are generated based on operations comprising: flattening elements of the first type of facial feature data to obtain flattened data; and concatenating the flattened data to generate the first feature vector.

The embodiments described in the present disclosure can be freely combined.

In some embodiments, a non-transitory computer-readable storage medium storing a bitstream is also provided. The bitstream can be encoded and decoded according to any of the above-described methods.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method of decoding a bitstream to output one or more pictures for a video stream, the method including:
   - receiving a bitstream associated with a first type of facial feature data representing a facial picture; and
   - decoding, using coded information of the bitstream, one or more pictures,
   - wherein the decoding includes:
     - transforming the first type of facial feature data into a second type of facial feature data; and
     - reconstructing the facial picture based on the second type of facial feature data.

2. The method according to clause 1, wherein transforming the first type of facial feature data into the second type of facial feature data includes:
   - pre-processing the first type of facial feature data to generate a first feature vector that applies to a translator;
   - translating, by the translator, the first feature vector into a second feature vector being associated with the second type of facial feature data; and
   - post-processing the second feature vector to generate the second type of facial feature data.

3. The method according to clause 2, wherein the pre-processing includes:

flattening elements of the first type of facial feature data to obtain flattened data; and concatenating the flattened data to generate the first feature vector.

4. The method according to clause 3, wherein the first type of facial feature data includes a plurality of arrays representing the facial picture, and the flattened data include a plurality of vectors respectively corresponding to the arrays.

5. The method according to any of clauses 2 to 4, wherein the post-processing includes:

splitting the second feature vector to generate split data; and reshaping the split data to generate the second type of facial feature data.

6. The method according to clause 5, wherein the split data include a plurality of vectors, and the second type of facial feature data include a plurality of arrays respectively corresponding to the plurality of vectors.

7. The method according to any of clauses 2 to 6, wherein the translator is trained by a first set of samples as input organized in a format based on the first type of facial feature data and a corresponding second set of samples as target output organized in a format based on the second type of facial feature data, the first set of samples and the second set of samples representing a common facial picture.

8. The method according to any of clauses 2 to 7, wherein the first type of facial feature data and the second type of facial feature data are organized in two different formats selected from the following: 2D Landmarks, 2D keypoints, 3D keypoints, segmentation map, compact feature, or facial semantics.

9. The method according to any of clauses 1 to 8, wherein the bitstream includes entropy coded data of the first type of facial feature data, and the decoding further includes: entropy decoding the bitstream to obtain the first type of facial feature data.

10. The method according to any of clauses 1 to 9, wherein transforming the first type of facial feature data into the second type of facial feature data includes:

concatenating flattened data to generate a first feature vector that applies to a translator, the flattened data being generated by flattening elements of the first type of facial feature data;

translating, by the translator, the first feature vector into a second feature vector being associated with the second type of facial feature data;

splitting the second feature vector to generate split data; and reshaping the split data to generate the second type of facial feature data.

11. The method according to clause 10, wherein the bitstream includes entropy coded data of the flattened data, and the decoding further includes:

entropy decoding the bitstream to obtain the flattened data.

12. The method according to any of clauses 1 to 11, wherein transforming the first type of facial feature data into the second type of facial feature data includes:

translating, by a translator, a first feature vector being associated with the first type of facial feature data into a second feature vector being associated with the second type of facial feature data, wherein the first feature vector is concatenated from flattened data that is generated by flattening elements of the first type of facial feature data;

splitting the second feature vector to generate split data; and reshaping the split data to generate the second type of facial feature data.

13. The method according to clause 12, wherein the bitstream includes entropy coded data of the first feature vector, and the decoding further includes:

entropy decoding the bitstream to obtain the first feature vector.

14. A method of encoding a video sequence into a bitstream, the method including:

receiving a video sequence;

encoding one or more pictures of the video sequence; and generating a bitstream associated with the encoded pictures, wherein the encoding includes:

generating a first type of facial feature data representing a facial picture; and generating and encoding, into the bitstream, information associated with the first type of facial feature data, wherein the first type of facial feature data is transformable by a translator into a second type of facial feature data.

15. The method according to clause 14, wherein the bitstream includes entropy coded data of the first type of facial feature data.

16. The method according to clause 14, wherein the bitstream includes entropy coded data of flattened data that is generated by flattening elements of the first type of facial feature data.

17. The method according to clause 14, wherein the bitstream includes entropy coded data of a first feature vector that applies to the translator, and the first feature vector are generated based on operations including:

flattening elements of the first type of facial feature data to obtain flattened data; and concatenating the flattened data to generate the first feature vector.

18. A non-transitory computer readable storage medium storing a bitstream of a video for processing by a decoder that decodes the bitstream according to operations including:

transforming, using coded information of the bitstream associated with a first type of facial feature representing a facial picture, the first type of facial feature data into a second type of facial feature data; and reconstructing the facial picture based on the second type of facial feature data.

19. The non-transitory computer readable storage medium according to clause 18, wherein transforming the first type of facial feature data into the second type of facial feature data includes:

pre-processing the first type of facial feature data to generate a first feature vector that applies to a translator;

translating, by the translator, the first feature vector into a second feature vector being associated with the second type of facial feature data; and post-processing the second feature vector to generate the second type of facial feature data.

20. The non-transitory computer readable storage medium according to clause 19, wherein the pre-processing includes:

flattening elements of the first type of facial feature data to obtain flattened data; and concatenating the flattened data to generate the first feature vector.

21. The non-transitory computer readable storage medium according to clause 20, wherein the first type of facial feature data include a plurality of arrays representing the facial picture, and the flattened data include a plurality of vectors respectively corresponding to the arrays.

22. The non-transitory computer readable storage medium according to any of clauses 19 to 21, wherein the post-processing includes:

splitting the second feature vector to generate split data; and reshaping the split data to generate the second type of facial feature data.

23. The non-transitory computer readable storage medium according to clause 22, wherein the split data include a plurality of vectors, and the second type of facial feature data include a plurality of arrays respectively corresponding to the plurality of vectors.

24. The non-transitory computer readable storage medium according to any of clauses 19 to 23, wherein the translator is trained by a first set of samples as input organized in a format based on the first type of facial feature data and a corresponding second set of samples as target output organized in a format based on the second type of facial feature data, the first set of samples and the second set of samples representing a common facial picture.

25. The non-transitory computer readable storage medium according to any of clauses 19 to 24, wherein the first type of facial feature data and the second type of facial feature data are organized in two different formats selected from the following: 2D Landmarks, 2D keypoints, 3D keypoints, segmentation map, compact feature, or facial semantics.

26. The non-transitory computer readable storage medium according to any of clauses 18 to 25, wherein the bitstream includes entropy coded data of the first type of facial feature data, and the operations further include:

entropy decoding the bitstream to obtain the first type of facial feature data.

27. The non-transitory computer readable storage medium according to any of clauses 18 to 26, wherein transforming the first type of facial feature data into the second type of facial feature data includes:

concatenating flattened data to generate a first feature vector that applies to a translator, the flattened data being generated by flattening elements of the first type of facial feature data;

translating, by the translator, the first feature vector into a second feature vector being associated with the second type of facial feature data;

splitting the second feature vector to generate split data; and reshaping the split data to generate the second type of facial feature data.

28. The non-transitory computer readable storage medium according to clause 27, wherein the bitstream includes entropy coded data of the flattened data, and the operations further includes:

entropy decoding the bitstream to obtain the flattened data.

29. The non-transitory computer readable storage medium according to any of clauses 18 to 28, wherein transforming the first type of facial feature data into the second type of facial feature data includes:

translating, by a translator, a first feature vector being associated with the first type of facial feature data into a second feature vector being associated with the second type of facial feature data, wherein the first feature vector is concatenated from flattened data that is generated by flattening elements of the first type of facial feature data;

splitting the second feature vector to generate split data; and reshaping the split data to generate the second type of facial feature data.

30. The non-transitory computer readable storage medium according to clause 29, wherein the bitstream includes entropy coded data of the first feature vector, and the operations further includes:

entropy decoding the bitstream to obtain the first feature vector.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments.

Accordingly, although specific terms are employed, they are used in a generic and descriptive sense only and not for purposes of limitation.

What is claimed is:

1. A method of decoding a bitstream to output one or more pictures for a video stream, the method comprising:
receiving a bitstream associated with a first type of facial feature data representing a facial picture; and
decoding, using coded information of the bitstream, one or more pictures,
wherein the decoding comprises:
transforming the first type of facial feature data into a second type of facial feature data; and
reconstructing the facial picture based on the second type of facial feature data;
wherein transforming the first type of facial feature data into the second type of facial feature data comprises:
pre-processing the first type of facial feature data to generate a first feature vector that applies to a translator;
translating, by the translator, the first feature vector into a second feature vector being associated with the second type of facial feature data; and
post-processing the second feature vector to generate the second type of facial feature data;
wherein the post-processing comprises:
splitting the second feature vector to generate split data; and
reshaping the split data to generate the second type of facial feature data.

2. The method according to claim 1, wherein the pre-processing comprises:
flattening all elements of the first type of facial feature data to obtain flattened data; and
concatenating the flattened data to generate the first feature vector.

3. The method according to claim 2, wherein the first type of facial feature data comprises a plurality of arrays representing the facial picture, and the flattened data comprise a plurality of vectors respectively corresponding to the arrays.

4. The method according to claim 1, wherein the split data comprise a plurality of sub-vectors, and the second type of facial feature data comprise a plurality of arrays respectively corresponding to the plurality of sub-vectors.

5. The method according to claim 1, wherein the bitstream comprises entropy coded data of the first type of facial feature data, and the decoding further comprises:
entropy decoding the bitstream to obtain the first type of facial feature data.

6. The method according to claim 1, wherein the first type of facial feature data and the second type of facial feature data are organized in two different formats selected from the following: 2D Landmarks, 2D keypoints, 3D keypoints, segmentation map, compact feature, or facial semantics.

7. A method for video processing, performed by a face feature translator system, comprising:
pre-processing a first type of facial feature data to generate a first feature vector;
translating the first feature vector into a second feature vector being associated with the second type of facial feature data; and
post-processing the second feature vector to generate the second type of facial feature data; wherein the post-processing comprises:
splitting the second feature vector to generate split data; and
reshaping the split data to generate the second type of facial feature data.

8. The method according to claim 7, wherein the pre-processing comprises:
flattening all elements of the first type of facial feature data to obtain flattened data; and
concatenating the flattened data to generate the first feature vector.

9. The method according to claim 7, wherein the first type of facial feature data comprises a plurality of arrays representing the facial picture, and the flattened data comprise a plurality of vectors respectively corresponding to the arrays.

10. The method according to claim 7, wherein the split data comprise a plurality of sub-vectors, and the second type of facial feature data comprise a plurality of arrays respectively corresponding to the plurality of sub-vectors.

11. The method according to claim 7, wherein the first type of facial feature data and the second type of facial feature data are organized in two different formats selected from the following: 2D Landmarks, 2D keypoints, 3D keypoints, segmentation map, compact feature, or facial semantics.

12. A decoder comprising:
a translator configured to:
process a first type of facial feature data to generate a first feature vector;
translate the first feature vector into a second feature vector being associated with the second type of facial feature data; and
post-process the second feature vector to generate the second type of facial feature data; wherein the translator is further configured to:
split the second feature vector to generate split data; and
reshape the split data to generate the second type of facial feature data.

13. The decoder according to claim 12, wherein the translator is further configured to:
flatten all elements of the first type of facial feature data to obtain flattened data; and
concatenate the flattened data to generate the first feature vector.

14. The decoder according to claim 12, wherein the first type of facial feature data comprises a plurality of arrays representing the facial picture, and the flattened data comprise a plurality of vectors respectively corresponding to the arrays.

15. The decoder according to claim 12, wherein the split data comprise a plurality of sub-vectors, and the second type of facial feature data comprise a plurality of arrays respectively corresponding to the plurality of sub-vectors.

16. The decoder according to claim 12, wherein the first type of facial feature data and the second type of facial feature data are organized in two different formats selected from the following: 2D Landmarks, 2D keypoints, 3D keypoints, segmentation map, compact feature, or facial semantics.

* * * * *